United States Patent [19]
Kitaura et al.

[11] Patent Number: 5,247,433
[45] Date of Patent: Sep. 21, 1993

[54] MAN-MACHINE SYSTEM

[75] Inventors: Wataru Kitaura, Yokohama; Hiroshi Ujita, Mito; Mitsuko Fukuda, Hitachi, all of Japan

[73] Assignee: Hitachi, Ltd., Tokyo, Japan

[21] Appl. No.: 495,919

[22] Filed: Mar. 20, 1990

[30] Foreign Application Priority Data

Mar. 20, 1989 [JP] Japan .................. 1-66216

[51] Int. Cl.⁵ .......................................... G06F 15/46
[52] U.S. Cl. ................................. 364/188; 364/146; 395/155; 376/216
[58] Field of Search .............. 364/188-190, 364/492, 493, 146, 552, 551.01, 709.11; 395/155, 162; 376/215-217

[56] References Cited

U.S. PATENT DOCUMENTS

| 4,894,777 | 1/1990 | Negishi et al. ......... 364/188 |
| 4,957,690 | 4/1990 | Fennern ................. 364/188 |

FOREIGN PATENT DOCUMENTS

| 0055338 | 10/1981 | European Pat. Off. |
| 0245039 | 4/1987 | European Pat. Off. |
| 0233810 | 10/1986 | Japan. |
| 0146111 | 6/1988 | Japan ................... 364/188 |
| 0133199 | 5/1989 | Japan. |

OTHER PUBLICATIONS

M. Fujii et al., "Application of a Cognitive Model to Man-Machine Interface for Nuclear Powr Plants", Proceedings of the International ENS/ANS Conference to Thermal Reactor Safety, Oct. 2-7, 1986, pp. 327-336.

T. Ogino et al., "Intelligent Man-Machine Communication System for Nuclear Power Plants" Seminar on Operating Procedures for Abnormal Condition in Nuclear Power Plants, Munich, Jun. 23-27, 1986, pp. 1-9.

J. Rasmussen, "The Role of Cognitive Models of Operators in the Design, Operation and Licensing of Nuclear Power Plants, Proceedings of Workshop on Cognitive Modeling of Nuclear Plant Control Room Operators", Aug. 15-18, 1982 Oak Ridge National Laboratory.

*Primary Examiner*—Jerry Smith
*Assistant Examiner*—Thomas E. Brown
*Attorney, Agent, or Firm*—Antonelli, Terry, Stout & Kraus

[57] ABSTRACT

A man-machine system connected to a plant has a storage device for storing data of an ideal operator model and recognizing section for inputting voice information generated by the operator and information about the operator's line of sight. When information about a failure in the plant is input into the man-machine system, plant data or operation information provided at the corresponding locations on an operational panel recognized by the recognizing section according to voice information or information about the operator's line of sight is selected and shown to the operator, so that the operator can take remedial measures for the failure quickly.

13 Claims, 28 Drawing Sheets

KNOWLEDGE USED FOR PROCESSING IN THE PLANT STATUS EVALUATOR

IDEAL OPERATOR MODEL MADE BY THE PLANT STATUS EVALUATOR

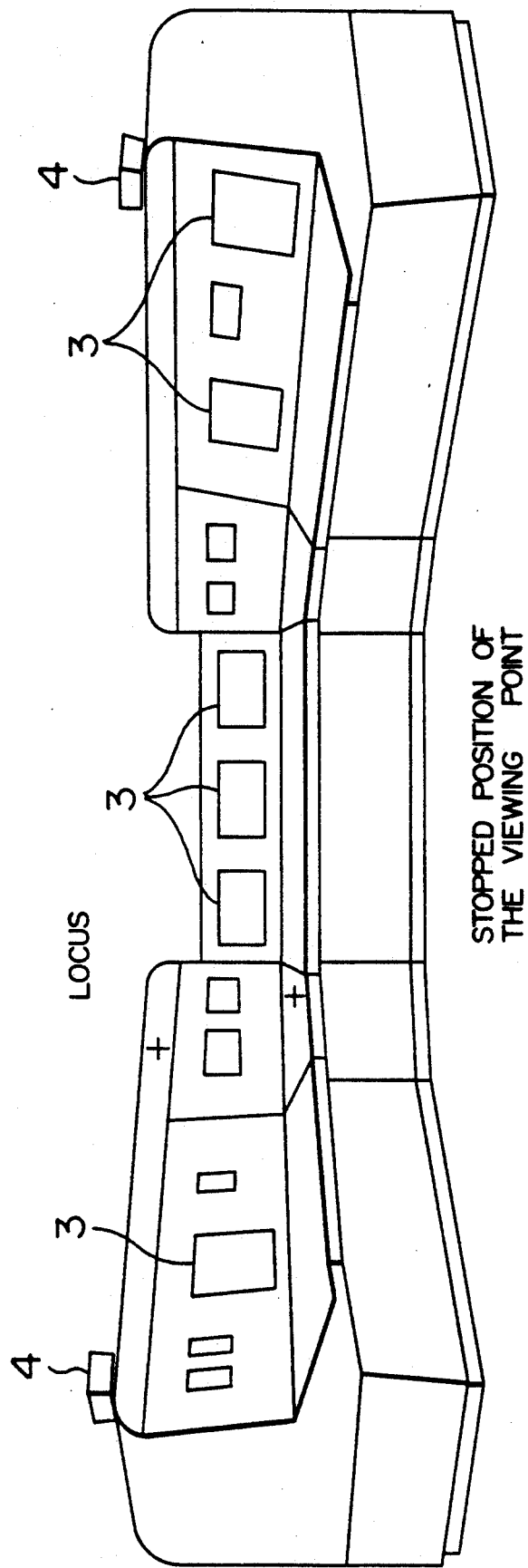

FIG. 7

RESULTS FROM PROCESSING OF FIG. 6A

| TIME | OBJECTS GAZED AT | VIEWING DURATION |
|------|------------------|------------------|
| $t_0$ | DEVICE a OF CRT 1 | $\tau_0$ |
| $t_1$ | DATA b OF CRT 1 | $\tau_1$ |
| $t_2$ | INDICATOR a OF PANEL 1 | $\tau_2$ |
| | | |

PROCESS IN THE VOICE RECOGNIZER

STEP 401 UNDERSTANDING SPEECH CONTENTS (FROM FIG.10)

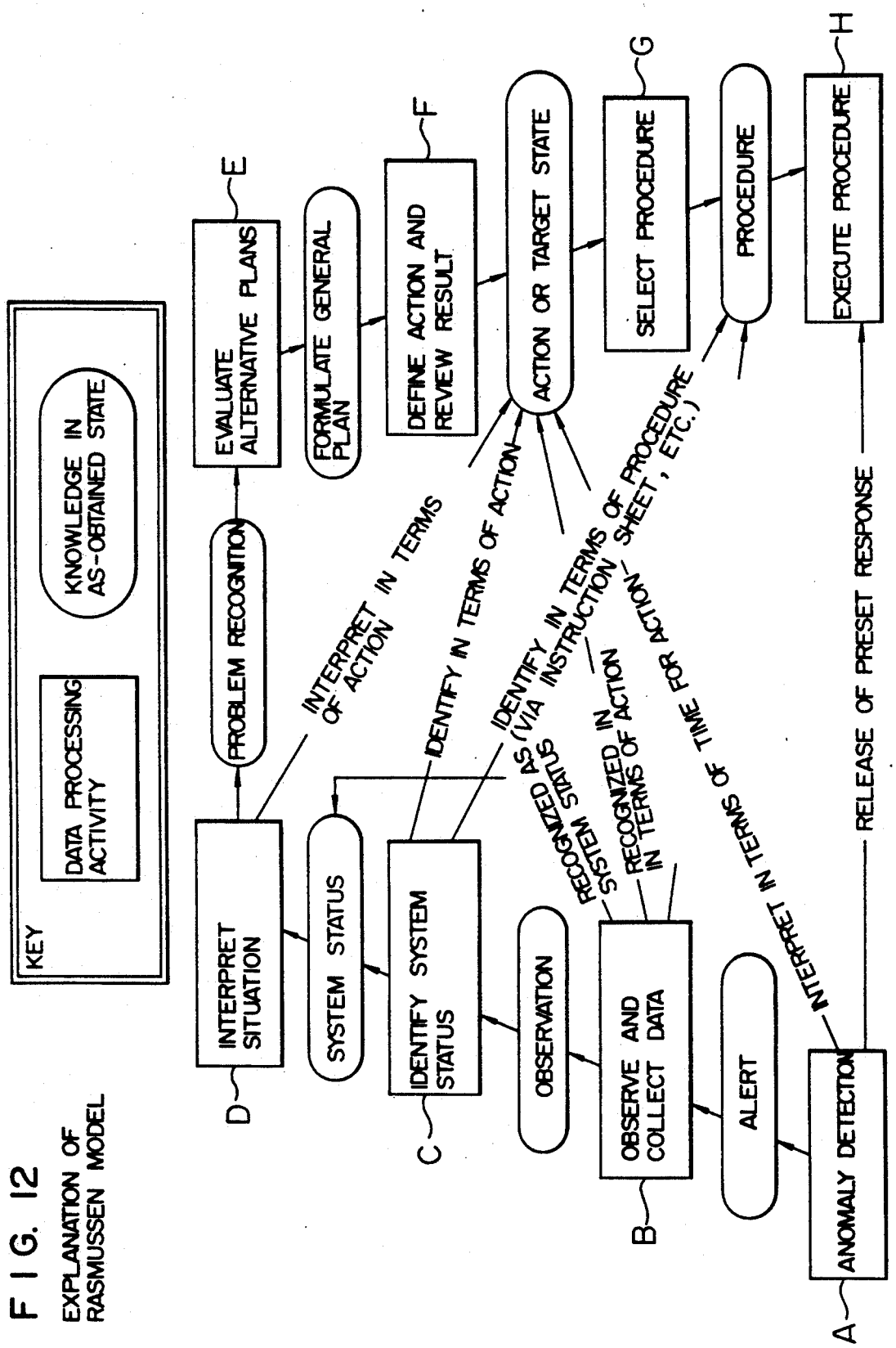
FIG. 12 EXPLANATION OF RASMUSSEN MODEL

F I G. 13

KNOWLEDGE USED TO ESTIMATE COGNITIVE PROCESS
ACTIVITY FROM VOICE INFORMATION FROM THE OPERATOR

| COGNITIVE PROCESS ACTIVITY | DESCRIPTION OF OPERATOR'S EXPRESSIONS | EXAMPLES OF EXPRESSION |
|---|---|---|
| ANOMALY DETECTION | • AN EXPRESSION TO THE EFFECT THAT ALARM ACTIVATION WAS CONFIRMED<br>• AN EXPRESSION TO THE EFFECT THAT DEVIATION OF PROCESS DATA FROM NORMAL VALUE WAS DETECTED | "THE ALARM XXX HAS BEEN ACTIVATED"<br>"THE WATER LEVEL HAS RISEN A LITTLE" |
| OBSERVATION AND DATA COLLECTION | • AN EXPRESSION ABOUT VALUES AND CHANGES OF PROCESS DATA | "CHECK THE TEMPERATURE"<br>"THE TEMPERATURE IS 60°C" |
| IDENTIFICATION OF SYSTEM STATUS | • AN EXPRESSION ABOUT PLANT STATUS<br>• AN EXPRESSION ABOUT DEVICE OPERATION STATUS | "THE PRESSURE HAS DECREASED"<br>"THE XXX VALVE DOES NOT OPEN" |
| DECISION ON ACTION TO TAKE | • AN EXPRESSION ABOUT PLANT OPERATION | "SCRAM OCCURRED"<br>"REDUCE THE PRESSURE" |
| PROCEDURE SELECTION | • AN EXPRESSION ABOUT DEVICE OPERATION | "PRESS THE XXX SWITCH"<br>"OPEN THE XX VALVE" |

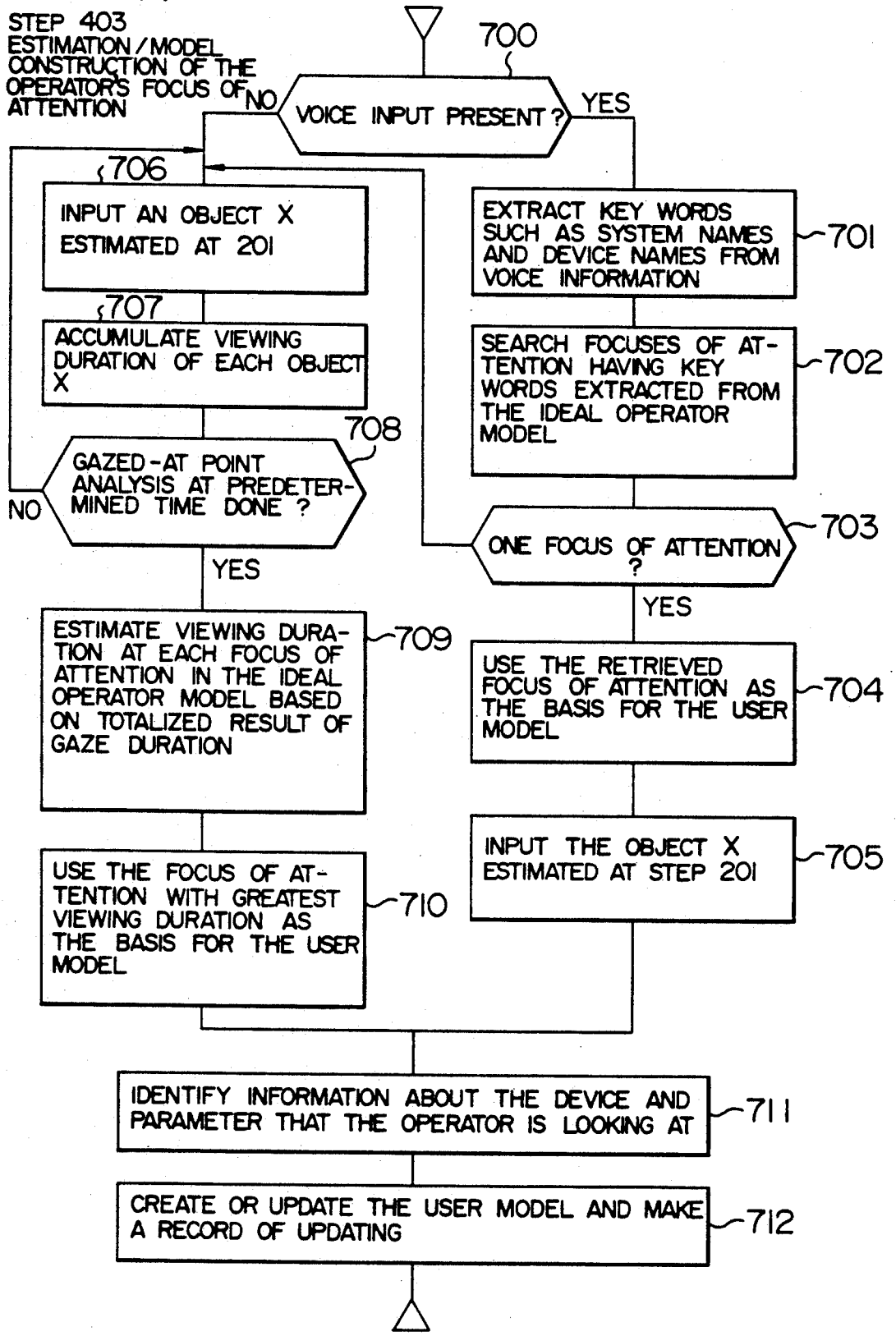

FIG. 16A   EDIT ALGORITHM
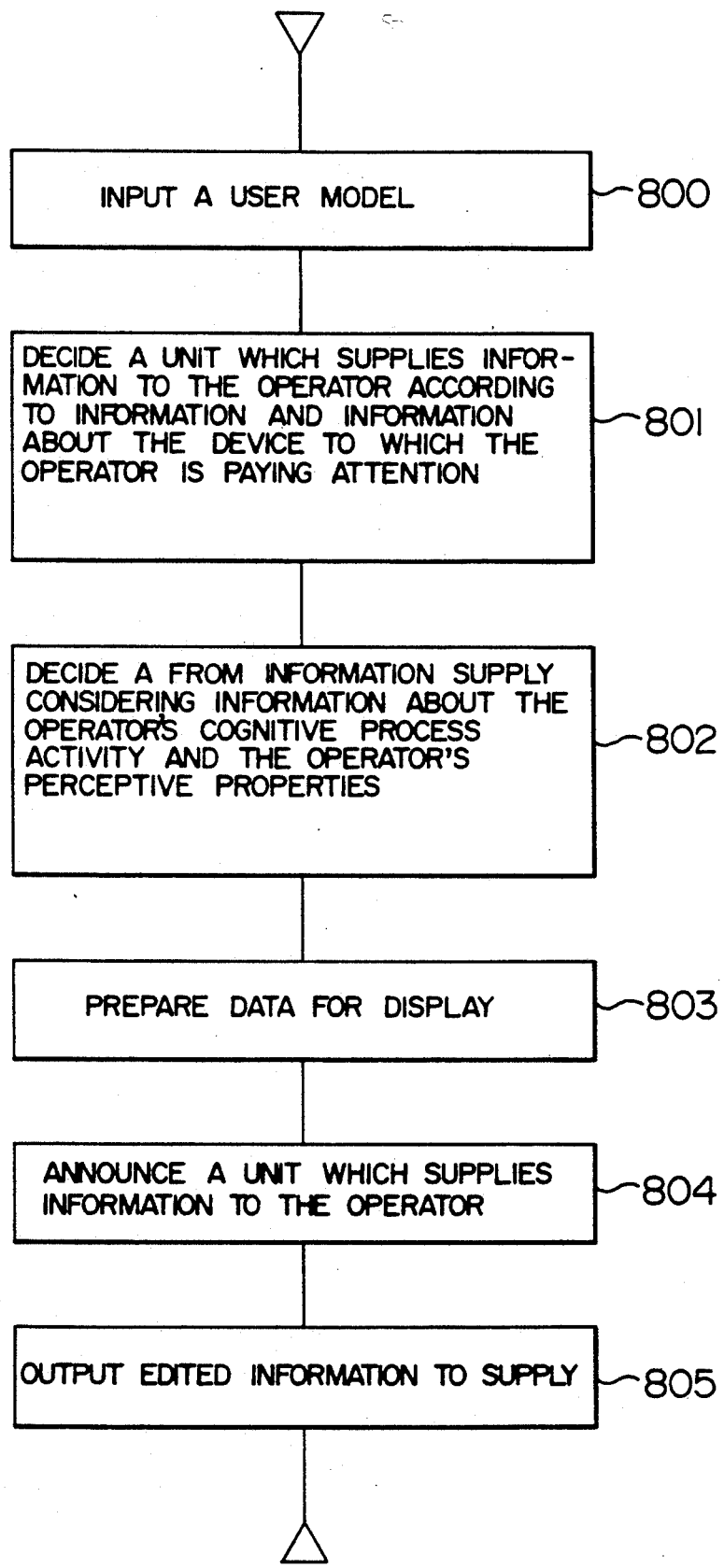

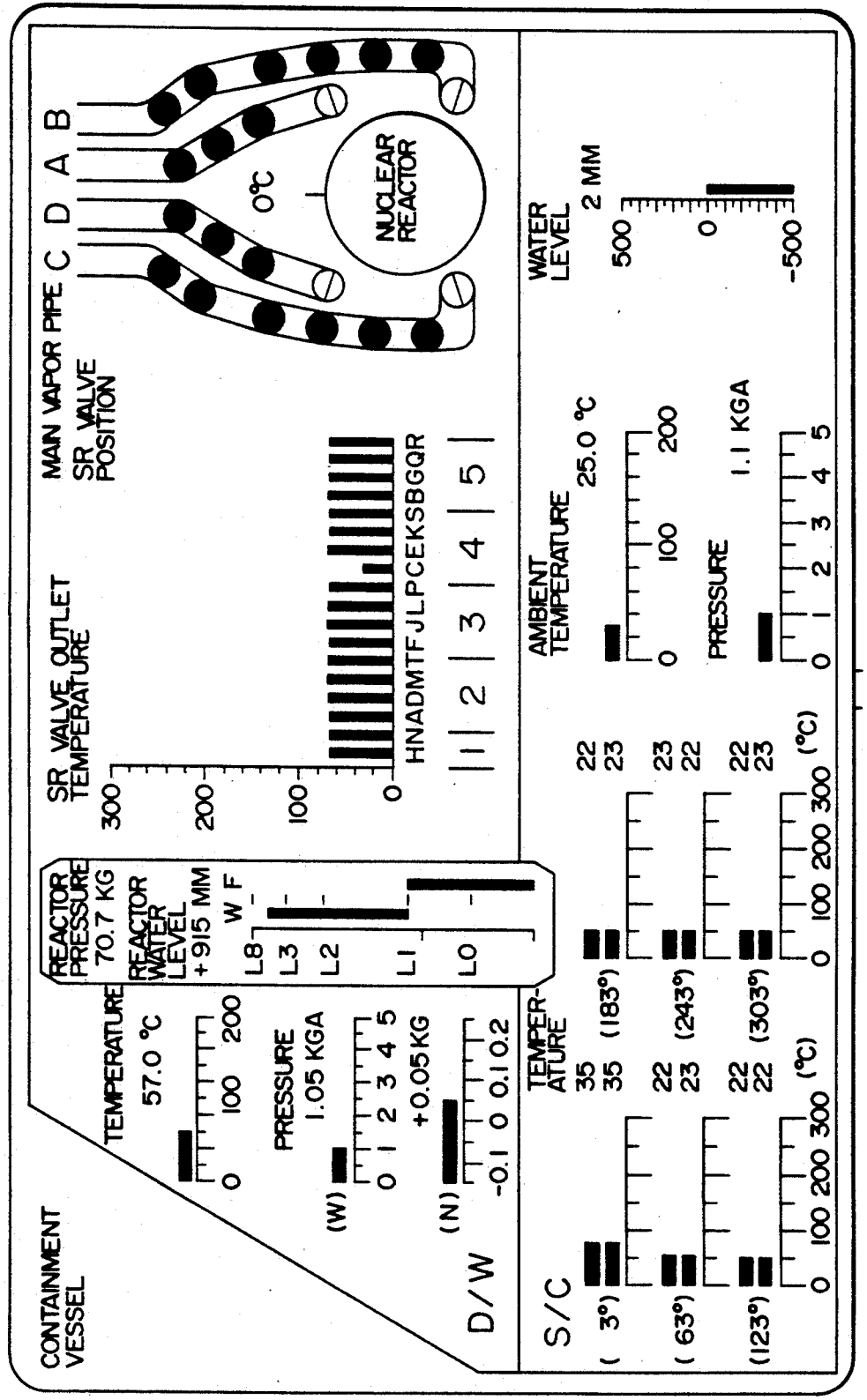
FIG. 16B  DISPLAY OF EDITED INFORMATION

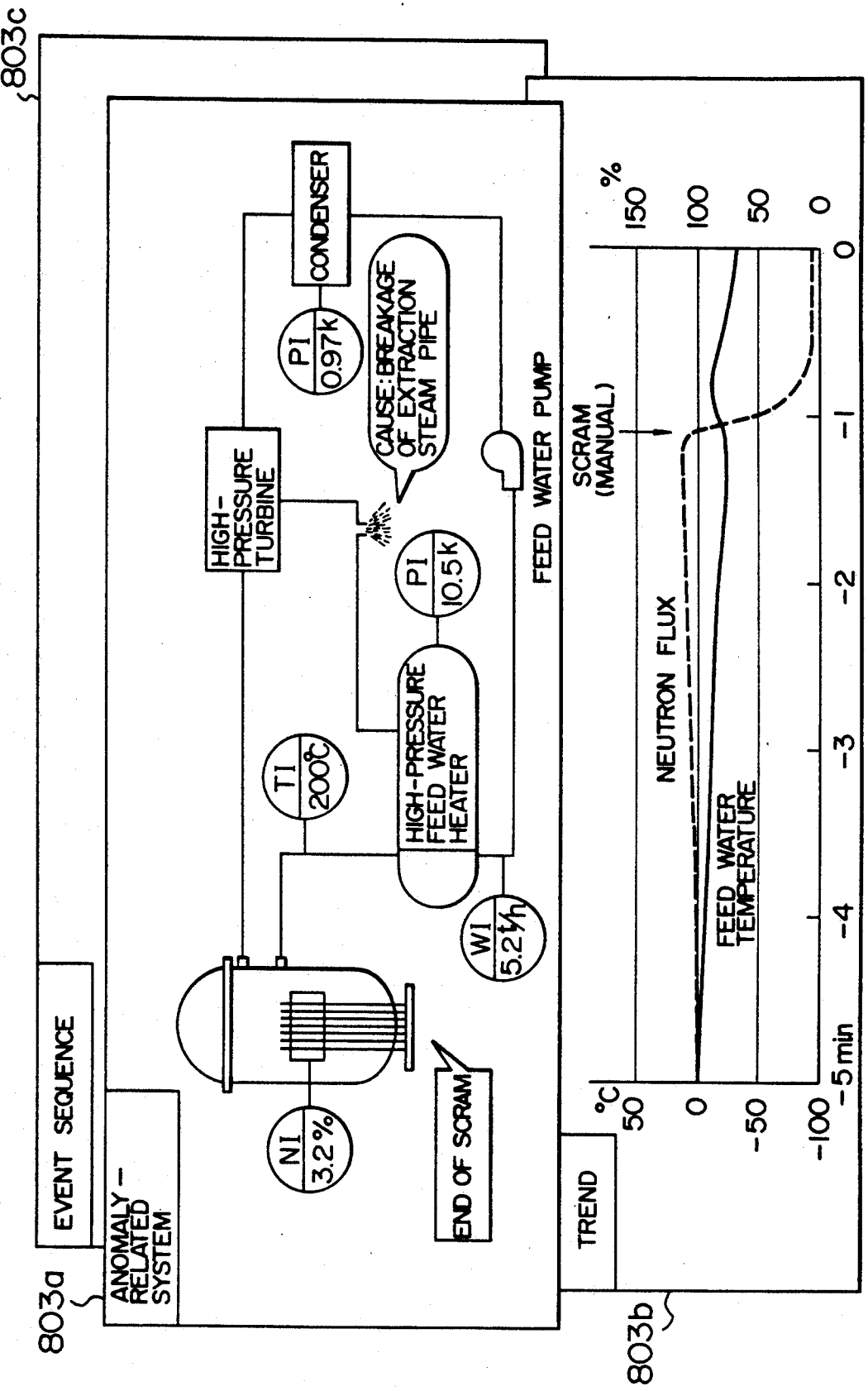
FIG. 16C  POST-EDIT DISPLAY OF A PLURALITY OF VIEWING POINTS OR A PLURALITY OF TYPES OF INFORMATION

DECISION ON A UNIT WHICH SUPPLIES INFORMATION TO THE OPERATOR (i) : QUERY ABOUT A VALUE OF PROCESS DATA
(ii) : QUERY ABOUT THE STATE OF CHANGE IN PROCESS DATA
(iii) : QUERY ABOUT OPERATION

FIG. 18

KNOWLEDGE USED IN THE INFORMATION EDITOR (1) if (A QUERY IS POSED ABOUT A VALUE OF DATA)
     (THE OPERATOR'S LINE OF SIGHT IS ON CRT-i)
  then (A VALUE OF DATA IS DISPLAYED ON CRT-i)

(2) if (A QUERY IS POSED ABOUT A VALUE OF DATA)
     (THE OPERATOR'S LINE OF SIGHT IS OFF CRT)
  then (A VALUE OF DATA IS OUTPUT IN VOICE)

(3) if (A QUERY IS POSED ABOUT CHANGE IN DATA)
     (THE OPERATOR'S LINE OF SIGHT IS ON CRT-i)
  then (A TREND DIAGRAM IS DISPLAYED ON CRT-i)

(4) if (A QUERY IS POSED ABOUT CHANGE IN DATA)
     (THE OPERATOR'S LINE OF SIGHT IS OFF CRT)
     (THERE IS NO CHANGE IN DATA)
  then (A MESSAGE THAT THERE IS NO CHANGE IN DATA IS OUTPUT IN VOICE)

(5) if (A QUERY IS POSED ABOUT CHANGE IN DATA)
     (THE OPERATOR'S LINE OF SIGHT IS OFF CRT)
     (THERE IS CHANGE IN DATA)
  then (A MESSAGE THAT THERE IS CHANGE IN DATA IS OUTPUT IN VOICE)
     (A TREND DIAGRAM IS DISPLAYED ON A CRT ON WHICH THE OPERATOR'S LINE OF SIGHT RESTS)

(6) if (A QUERY IS POSED ABOUT CHANGE IN DATA)
     (THE OPERATOR IS BUSY WITH SOME OTHER OPERATION)
  then (VALUES OF DATA ARE OUTPUT PERIODICALLY IN VOICE)

(7) if (A QUERY IS POSED ABOUT CONTENT OF OPERATION)
     (THE OPERATOR'S LINE OF SIGHT IN OFF CRT)
  then (INFORMATION ABOUT OPERATION IS DISPLAYED ON CRT-i)
     (A MESSAGE THAT OPERATION IS DISPLAYED ON CRT-i)

FIG. 19

(1) if (THE OPERATOR IS PERFORMING A DIAGNOSTIC PROCESS)
   then (A GRAPHIC FROM RESEMBLING A SYSTEM CONFIGURATION IS DISPLAYED)

(2) if (A PROCESS IS EXECUTED IN WHICH THE OPERATOR DECIDES ON OPERATING PROCEDURE)
   then (THE OPERATING PROCESS IS DISPLAYED IN A FLOW FORM)

(3) if (THE OPERATOR IS PERFORMING A TARGET SETTING PROCESS)
   then (PREDICTION RESULTS OF DATA VALUES ARE DISPLAYED IN TERMS OF TREND)

(4) if (INFORMATION J1 IS ALREADY DISPLAYED ON A CRT ON WHICH OTHER INFORMATION IS TO BE OUTPUT)
       (THE IMPORTANCE OF INFORMATION J1 IS HIGHER THAN THAT OF INFORMATION J2 REQUESTED BY THE USER)
   then (WHILE INFORMATION J1 IS BEING DISPLAYED, A WINDOW IS FORMED IN WHICH INFORMATION J2 IS DISPLAYED)

(5) if (THERE IS INFORMATION J3 WHICH IS MORE IMPORTANT THAN INFORMATION J2 REQUESTED BY THE USER)
       (INFORMATION J3 HAS NOT BEEN DISPLAYED)
   then (INFORMATION J2 AND J3 IS DISPLAYED)
       (IT IS ANOUNCED THAT INFORMATION J3 IS IMPORTANT)

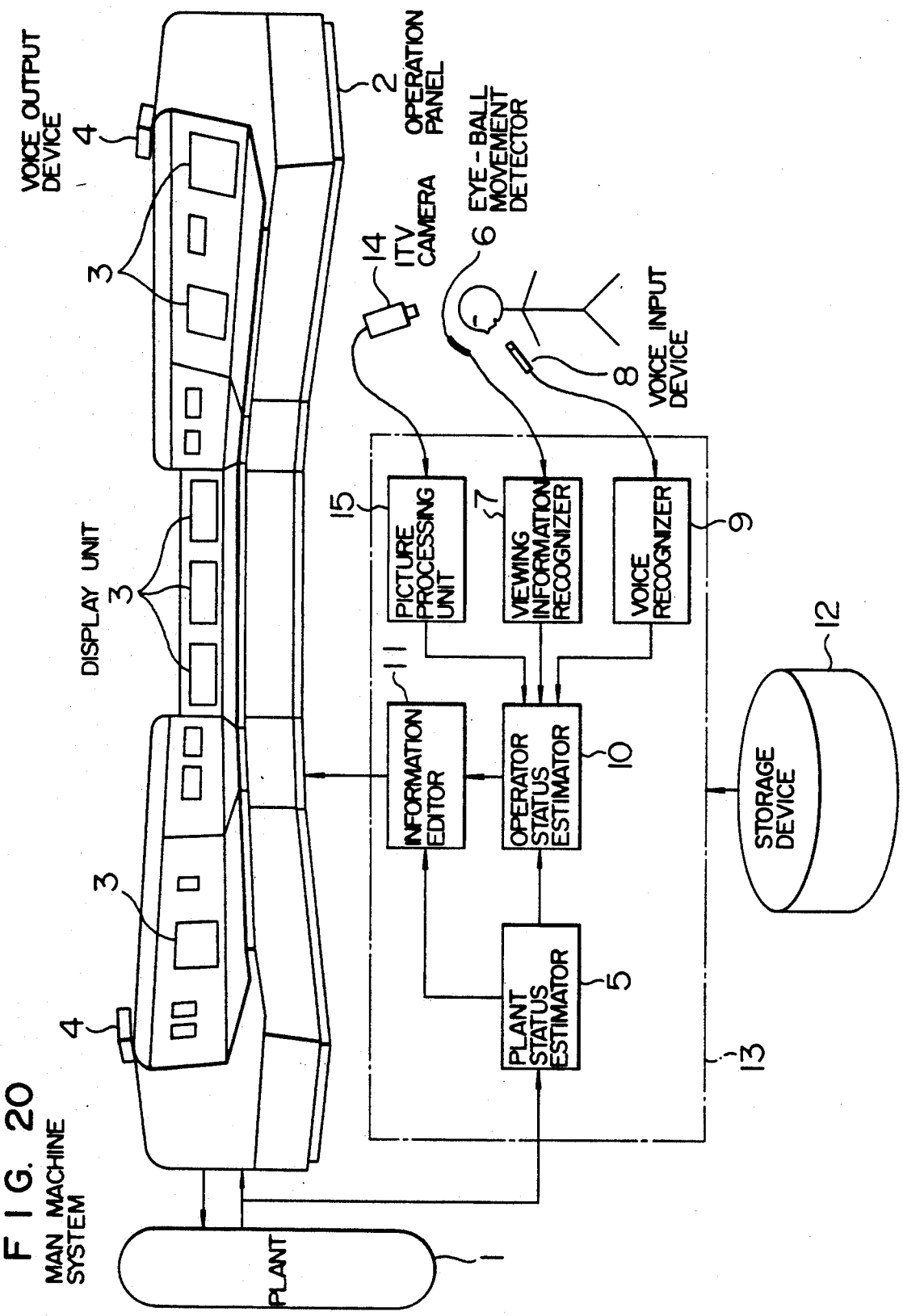
FIG. 20 MAN MACHINE SYSTEM

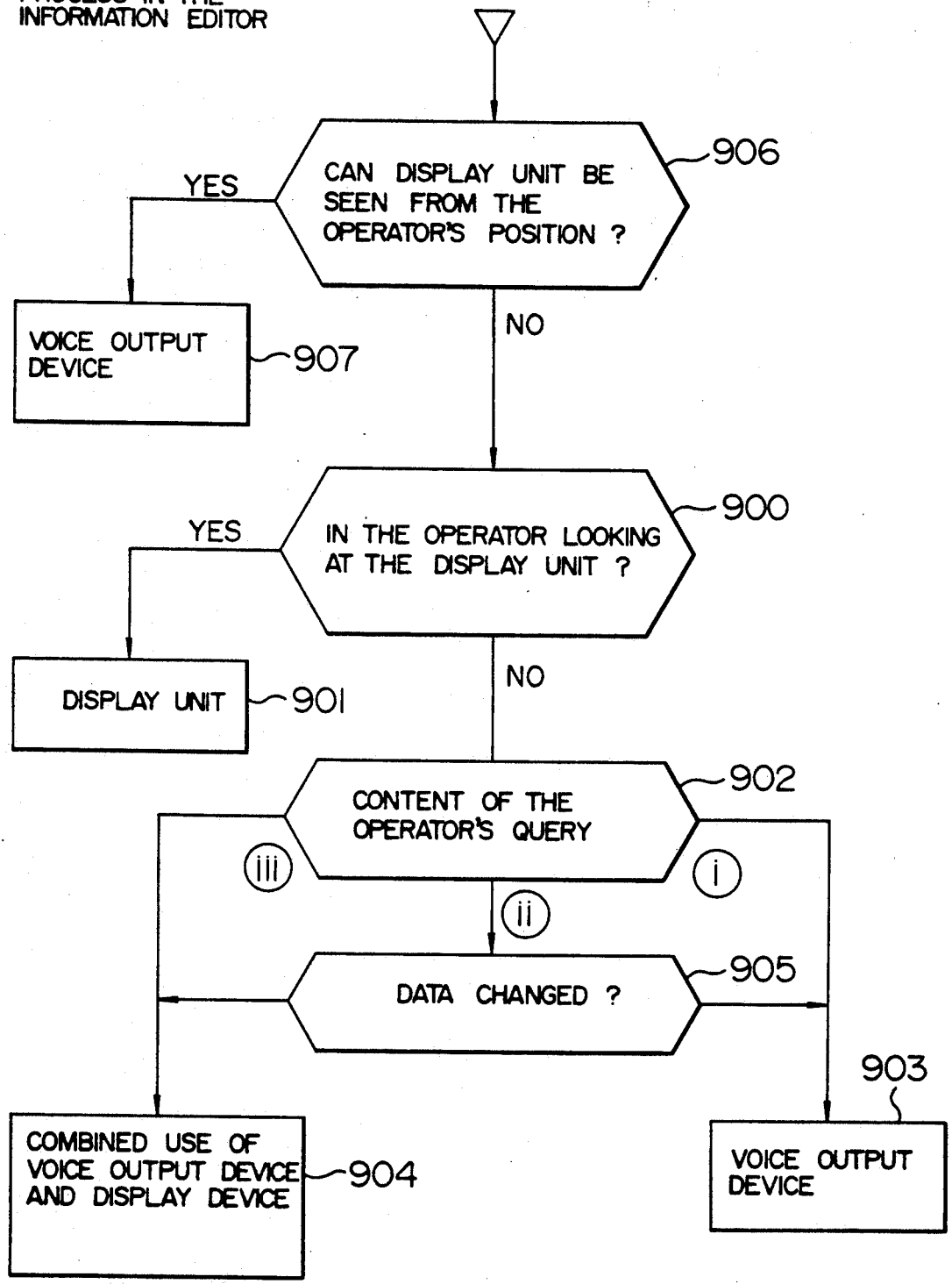

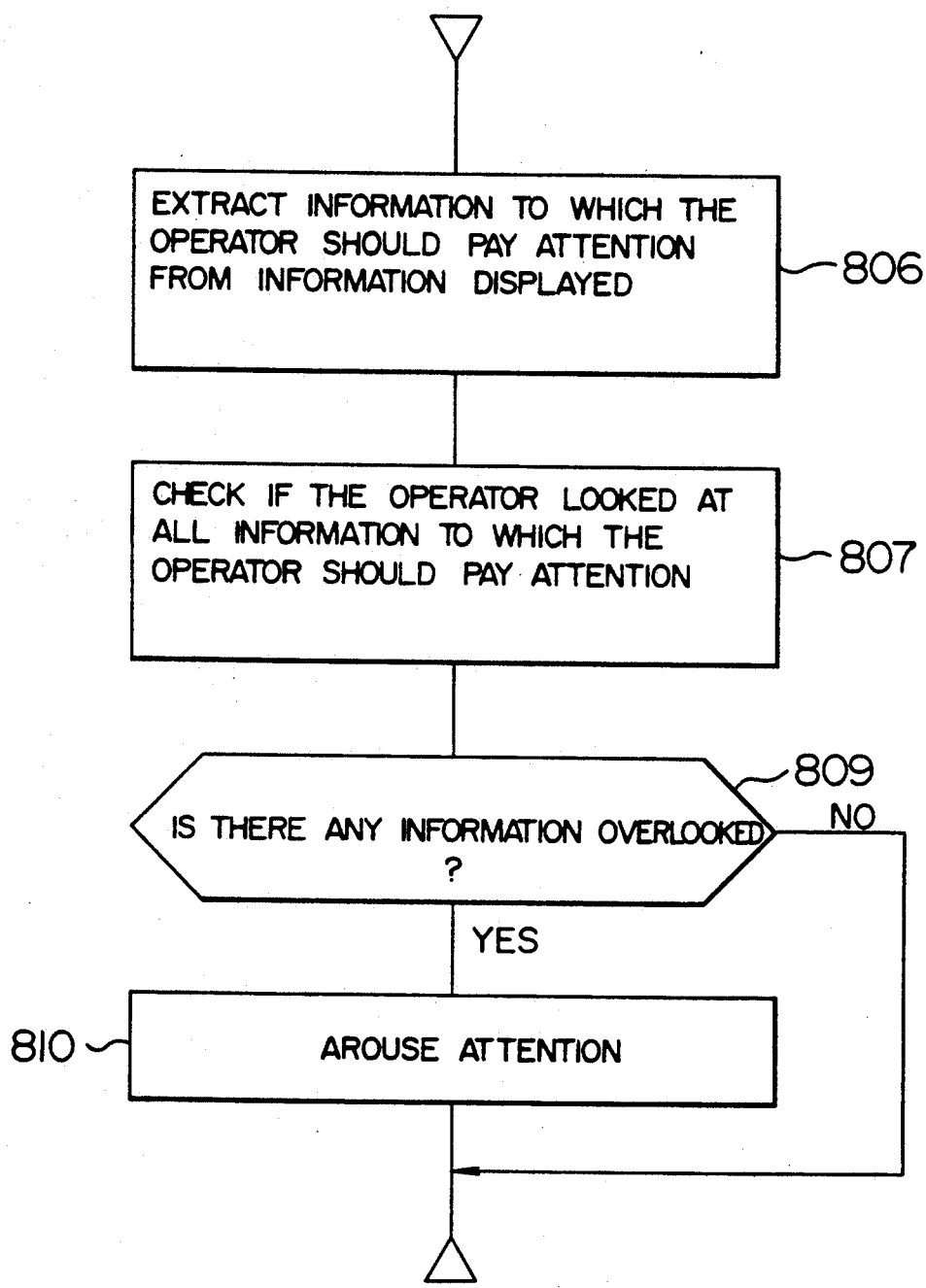

PROCESS IN THE INFORMATION EDITOR (FROM FIG. 21)

FIG. 24 MAN-MACHINE SYSTEM

FIG. 25

DATA ON DISPLAY SCREEN

AS A RESULT OF EVALUATION OF THE PLANT STATUS, FOCUSES OF ATTENTION HAVE BEEN EXTRACTED

INPUT A FOCUS OF ATTENTION TO WHICH YOU ARE PAYING ATTENTION AT THE MOMENT

| (FOCUS OF ATTENTION 1) | (FOCUS OF ATTENTION 2) | (FOCUS OF ATTENTION 3) |
|---|---|---|
| (FOCUS OF ATTENTION 4) | (FOCUS OF ATTENTION 5) | (FOCUS OF ATTENTION 6) |

MAN-MACHINE SYSTEM

BACKGROUND OF THE INVENTION

This invention relates to a man-machine system, and particularly to a man-machine system suitable for application to operation panels of plants.

There is a technology for entering voice information into a man-machine system serving as a man-machine interface for a computer system for control of a plant, etc. and providing information in a form suitable for the characteristics of the operator. This technology is known by literature, such as M. Fujii et al., "Application of a Cognitive Model to Man-Machine Interfaces for Nuclear Power Plants", and T. Ogino et al., "Intelligent ManMachine Communication System for Nuclear Power Plants", Seminar on Operating Procedures for Abnormal Conditions in Nuclear Power Plants, Munich, 23–27 June 1986, pp. 1–9. The cognitive model of the operator in a plant is described in J. Rasmussen, "The Role of Cognitive Models of Operators in the Design, Operation and Licensing of Nuclear Power Plants", Proceedings of Workshop on Cognitive Modeling of Nuclear Plant Control Room Operators, Aug. 15–18, 1982, Oak Ridge National Laboratory, pp. 13 and 20. Japanese Patent Application Nos. 61-233810 and 61-133199 disclose man-machine systems incorporating display control by voice and a question-and-answer function. With the prior-art systems, however, if the operator is mistaken about the plant condition or is unable to focus his attention and is thinking about many things, there is a possibility that information suitable for the system cannot be obtained.

In addition, the operator sometimes makes a wrong representation without knowing it or forgets a name of a device, for example, and makes an abstract representation. In such a case, the above-mentioned problem is liable to occur.

SUMMARY OF THE INVENTION

A first object of the invention is to provide a man-machine system capable of suitably providing information necessary for the operator even if the operator gives an abstract representation to the system.

A second object of the invention is to provide a man-machine system capable of providing timely information adequate for the thinking process of the operator.

A third object of the invention is to provide a man-machine communication system capable of detecting with high accuracy the operator's failure to catch important information.

A fourth object of the invention is to provide a man-machine system capable of providing information at an information output unit convenient for the operator.

A fifth object of the invention is to provide a man-machine system capable of preparing supplied information without omission of important information.

According to this invention, there is provided a man-machine communication system comprising:

means for preparing a first operator model including a plurality of focuses of attention on a certain operating condition of equipment to be controlled;

means for, based on voice information generated by the operator and information about the operator's line of sight, estimating a focus of attention that the operator needs to have out of all the focuses of attention included in the first operator model;

means for preparing a second operator model corresponding to an operator model including information of the estimated focus of attention; and means for making ready and editing information as to the operation of the above-mentioned manual control means by using information of the estimated focus of attention included in the second operator model and information obtained from the equipment having the manual control means.

The man-machine system according to this invention may comprise means for estimating a stage of the operator's cognitive process activity by using said voice information and information about the operator's line of sight and means for deciding the form of information supplied based on the estimated cognitive process activity, whereby the information edit means can edit supplied information based on the decided supplied form of information.

The man-machine system according to this invention may comprise means for checking whether or not the operator looked at the information edited by the information edit means within a time period predetermined in response to conditions of an equipment based on the line-of-sight information and outputting an attentiona-rousing signal when there is information the operator has not looked at.

The man-machine system according to this invention may comprise means for deciding a unit to give information to by using voice information and means for editing supplied information by using information of the estimated focus of attention included in the second operator model and information obtained from the equipment having the manual control means and outputting the supplied information to the above-mentioned deciding unit which supplies information to the operator.

The man-machine system according to this invention may comprise means for comparing information obtained by the information edit means with information included in the second operator model to check if there is any piece of the latter information that is not included in the former, wherein if there is any piece of the latter information mentioned above that is not included in the former information mentioned above, the information is edited by the information edit means.

According to a first aspect of this invention, using voice information generated by the operator and information about the operator's line of sight, it is possible to estimate a focus of attention that the operator needs out of the focuses of attention included in the first operator model. Even if the voice information is abstract, the use of the line-of-sight information in combination with the voice information permits an accurate estimation of the focus of attention that the operator needs. Therefore, information edited by using information of the estimated focus of attention and information obtained from the equipment having the manual control means, is appropriate information necessary for the operator even if the operator represented the voice information in abstract form.

According to a second aspect of this invention, the stages of the operator's cognitive process activity are estimated by using voice information and the line-of-sight information, so that it is possible to accurately estimate what the operator is thinking, and by making a decision on a supplied form of information according to the estimated stage of cognitive process activity, information suitable for the thinking process of the operator can be edited appropriately and timely.

According to a third aspect of this invention, check is made based on line-of-sight information to see if the operator looked at information edited by the information editing means, so that it is possible to check with high accuracy whether the operator is overlooking important information.

According to a fourth aspect of this invention, a unit to give information to is decided by voice information and line-of-sight information and supplied information is supplied to the deciding unit to receive information, so that information can be supplied to an information output unit which is conveniently located for the operator to obtain information easily.

According to a fifth aspect of this invention, comparison is made between information obtained by the information edit means and information included in the second operator model in order to check if there is any piece of the latter information that is not included in the second operator model, so that omission of important information can be ascertained easily, making it possible to prepare supplied information without omission of important information.

BRIEF DESCRIPTION OF THE DRAWINGS

FIG. 6B is a diagram showing the movement of the viewing point on the operation panel;

FIG. 7 an explanatory diagram showing data on objects gazed at and viewing duration obtained by the procedure of FIG. 6;

FIG. 12 is an explanatory diagram of a model proposed by J. Rasmussen;

FIG. 13 is an explanatory diagram of knowledge used in estimating cognitive process activity from voice information given by the operator;

FIG. 14 is an explanatory diagram showing a detailed procedure of step 403 of FIG. 9;

FIG. 16A is an explanatory diagram showing a procedure to be executed in the information editor in FIG. 1;

FIGS. 16B and 16C are displays after editing;

FIGS. 18 and 19 are explanatory diagrams of knowledge used in the information editor according another embodiment of this invention;

FIGS. 20 and 24 are configuration diagrams of man-machine systems according to other embodiments of this invention;

FIG. 21 is an explanatory diagram showing a part of a procedure to be executed in the information editor in FIG. 20;

FIGS. 22, and 23 are explanatory diagrams of procedure to be executed after the procedure of FIG. 21 in the information editor; and FIG. 25 is an explanatory diagram showing an example of data on the screen shown at the display unit according to the embodiment of FIG. 24.

DESCRIPTION OF THE PREFERRED EMBODIMENTS

Figure 1:
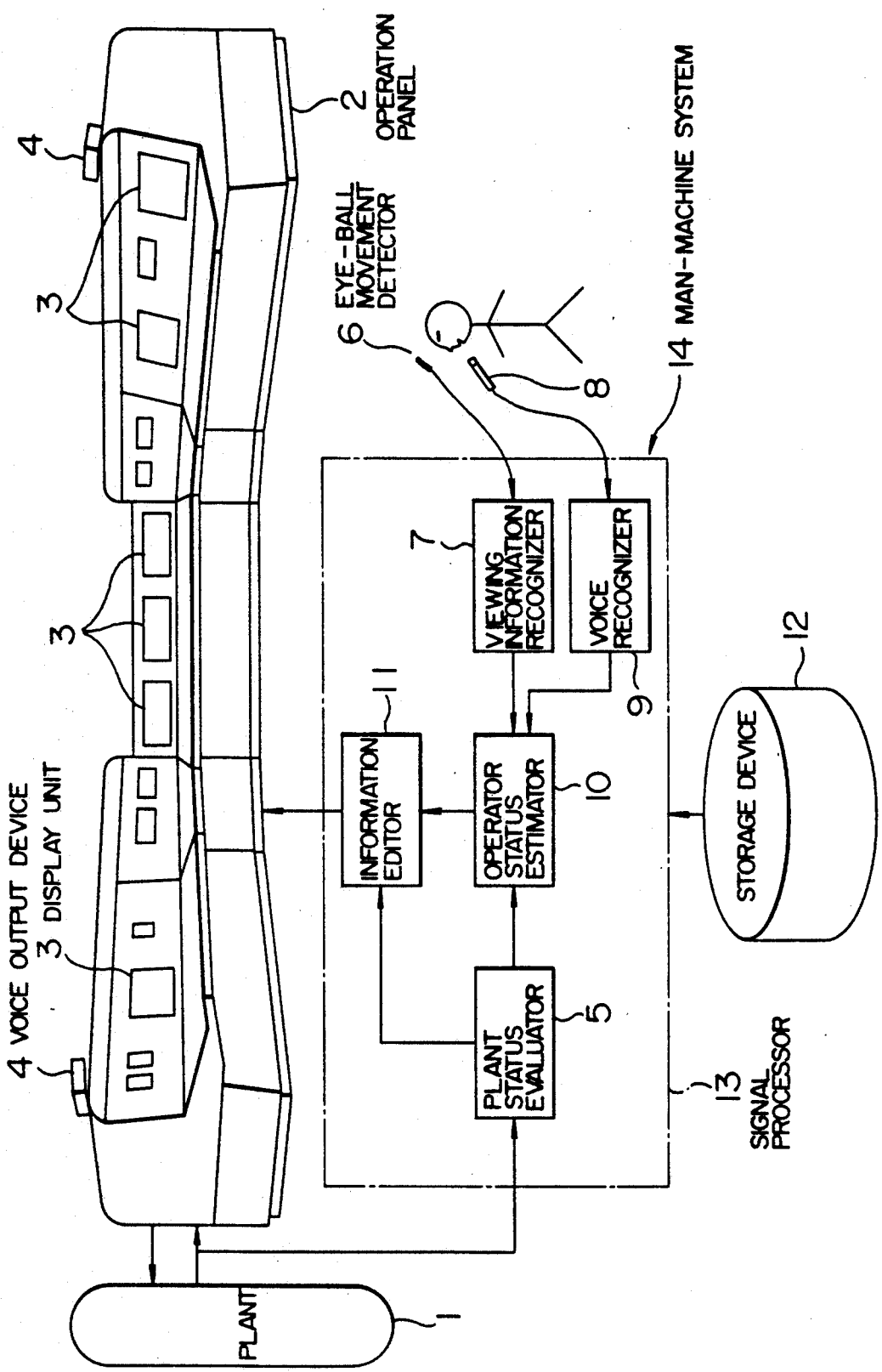
FIG. 1 is a configuration diagram of a man-machine system according to a preferred embodiment of this invention.

Referring to FIG. 1, a man-machine system according to a preferred embodiment of this invention will be described. This embodied example is a man-machine system applied to an operation panel in a plant (a nuclear reactor plant, for example). When anomaly occurs in a plant, it is important to display information necessary for the operator or information required for him to grasp the status of the plant so as to assist him in making a quick decision to prevent the anomaly from spreading.

Reference numeral 1 indicates a plant, 2 indicates an operation panel including a plurality of display units 3 and voice output devices 4. The operation panel 2 has means, not shown, to specify the manipulation of buttons and switches to output operation commands (or control signals) to a plant.

The man-machine system comprises display units 3, plant status evaluation 5, an eye-ball movement detector 6, viewing information recognizer 7, a voice input device 8 (a microphone, for example), a voice recognizer 9, an operator status estimator 10, an information editor 11, and a storage device 12. The display units 3 also serve for the operation panel 2. Those components of the man-machine system, excluding the eye-ball movement detector 6, the voice input device 8, and the display units 3, are formed by an electronic computer. For the storage device, either an external memory or internal memory of the computer may be used. Furthermore, the plant status evaluator 5, the viewing information recognizer 7, the voice recognizer 9, the operator status estimator 10, and the information editor 11 may be formed of microprocessors, respectively. The signal processor 13 includes the plant status evaluator 5, the viewing information recognizer 7, the voice recognizer 9, the operator status estimator 10, and the information editor 11.

The plant status evaluator 5 takes in measurement data of and signals from the plant, and evaluates the plant status. The eye-ball movement detector 6 detects the movement of the operator's eye balls. The viewing information recognizer 7 analyzes signals outputted by the eye-ball movement detector 6, and recognizes the direction, area and spot of the operator's observation. The voice recognizer 9 recognizes speech. The operator status estimator 10 receives output signals from the plant status evaluator 5, the viewing information recognizer 7, and the voice recognizer 9, and estimates information concerning the location at which the operator is looking information or which he needs, and the determines the operator's intention. The information editor 11 receives output signals from the plant status evaluator 5 and to which operator status evaluator 10, and decides the unit (display unit 3 and voice output device 4) information is to be output and edits supplied information. The storage device 12 stores knowledge and data used in the processes of the units and devices mentioned above.

The content of the processing in this embodiment will be described.

Figure 2:
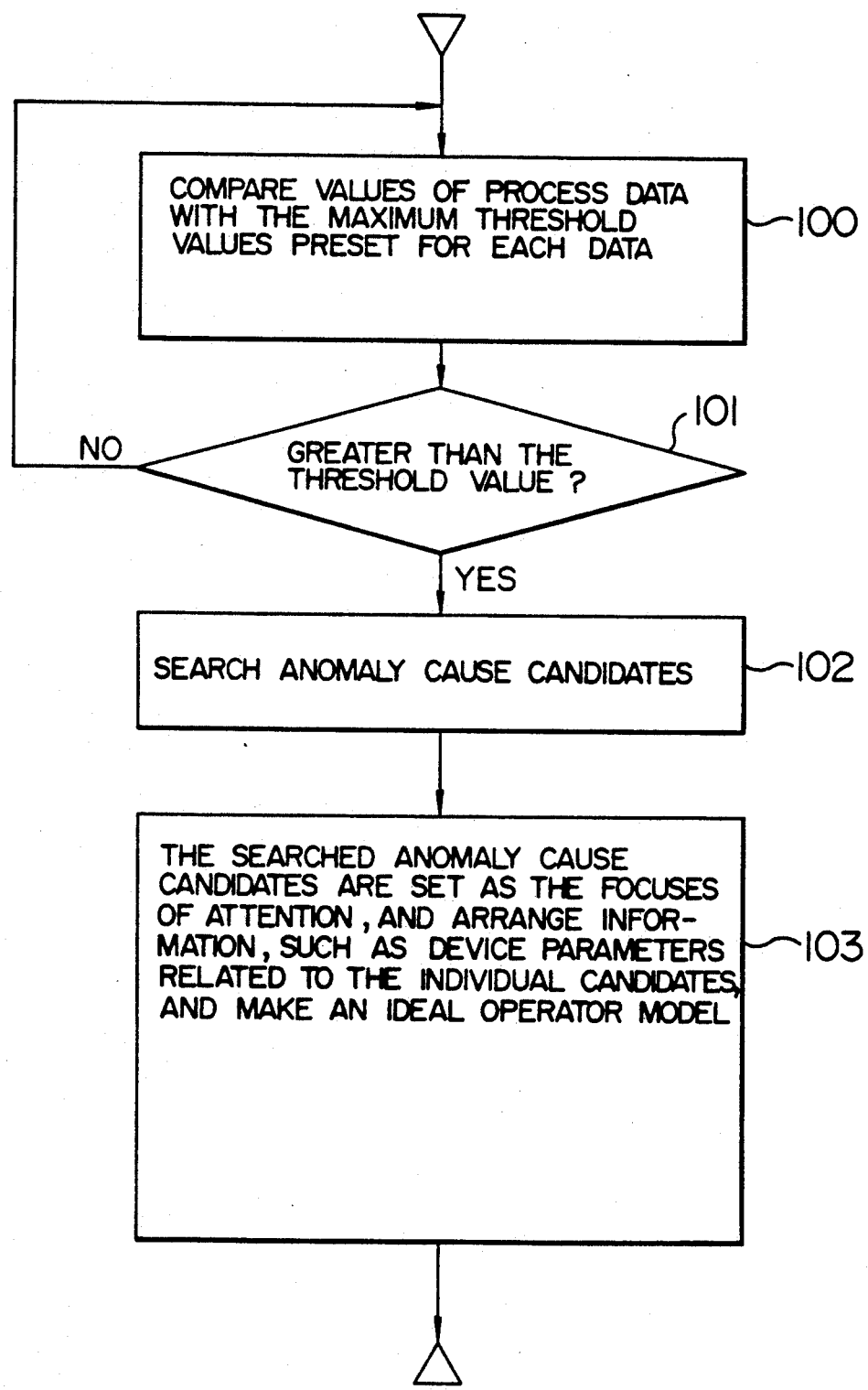
FIG. 2 is an explanatory diagram showing a procedure which is executed in the plant condition evaluator in FIG. 1.
Figure 3:
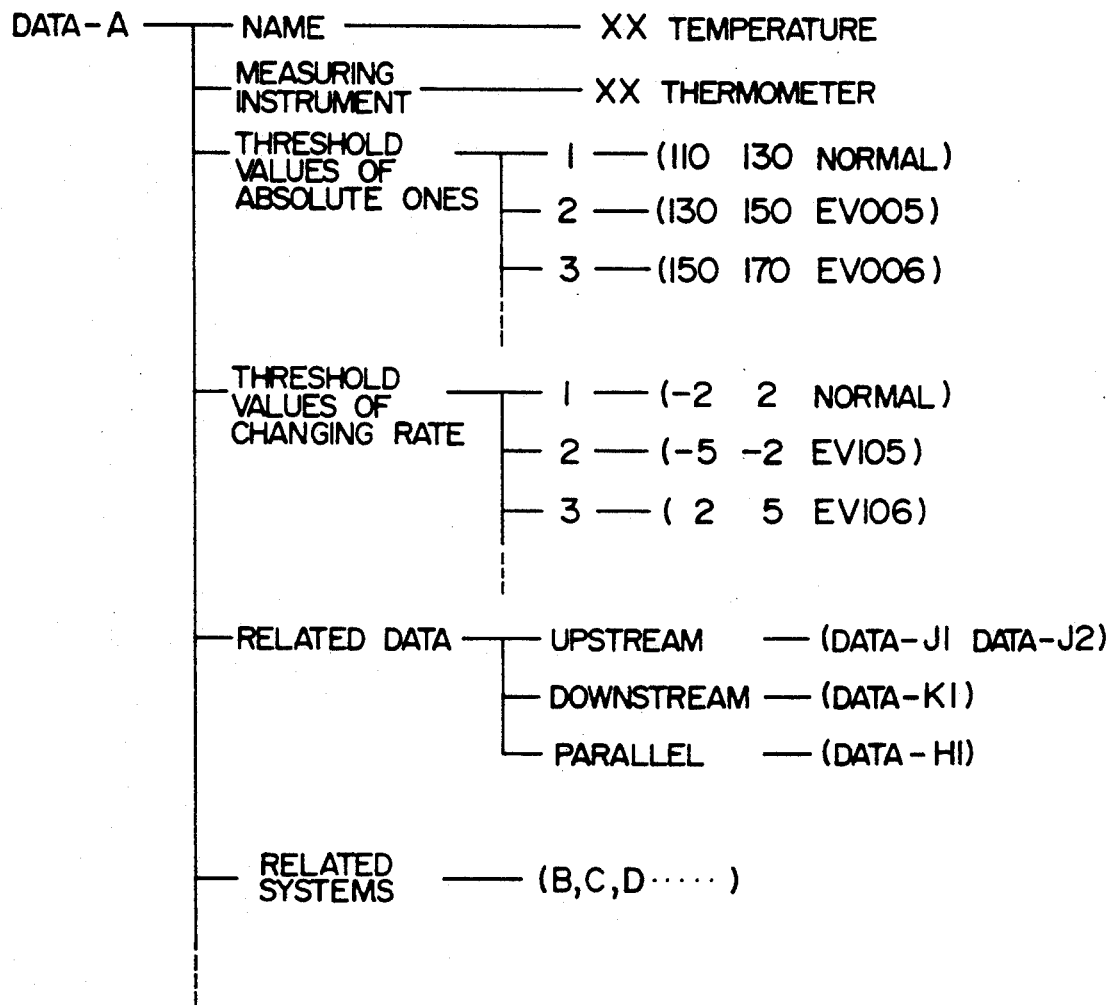
FIGS. 3 and 4 are diagrams for explaining the knowledge used in the plant condition evaluator.

FIG. 2 schematically shows a process flow of the plant status evaluator 5. At the process 100, measured process data of the plant 1 is taken in and compared with threshold values (alarm values preset for data of the respective processes, for example; some of them are shown in FIG. 3). If entered process data is within the normal range (in case of "no" at step 101), the process of step 100 is repeated. If the value of the process data exceeds the threshold value (judgment of step 101 is "yes"), the process of step 102 is executed, and a search is made for candidates of the cause of the anomaly. Then, the process of step 103 is executed, and the searched anomaly cause candidates are set as the focuses of attention to which the operator should pay attention. Information about the parameters and devices related to the set focuses of attention as described is arranged, and an ideal operator model (FIG. 5) for the focuses of attention is made. The ideal operator model will be described in detail later. Incidentally, a focus of attention is a part on which the operator should concentrate his thoughts.

Figure 4:
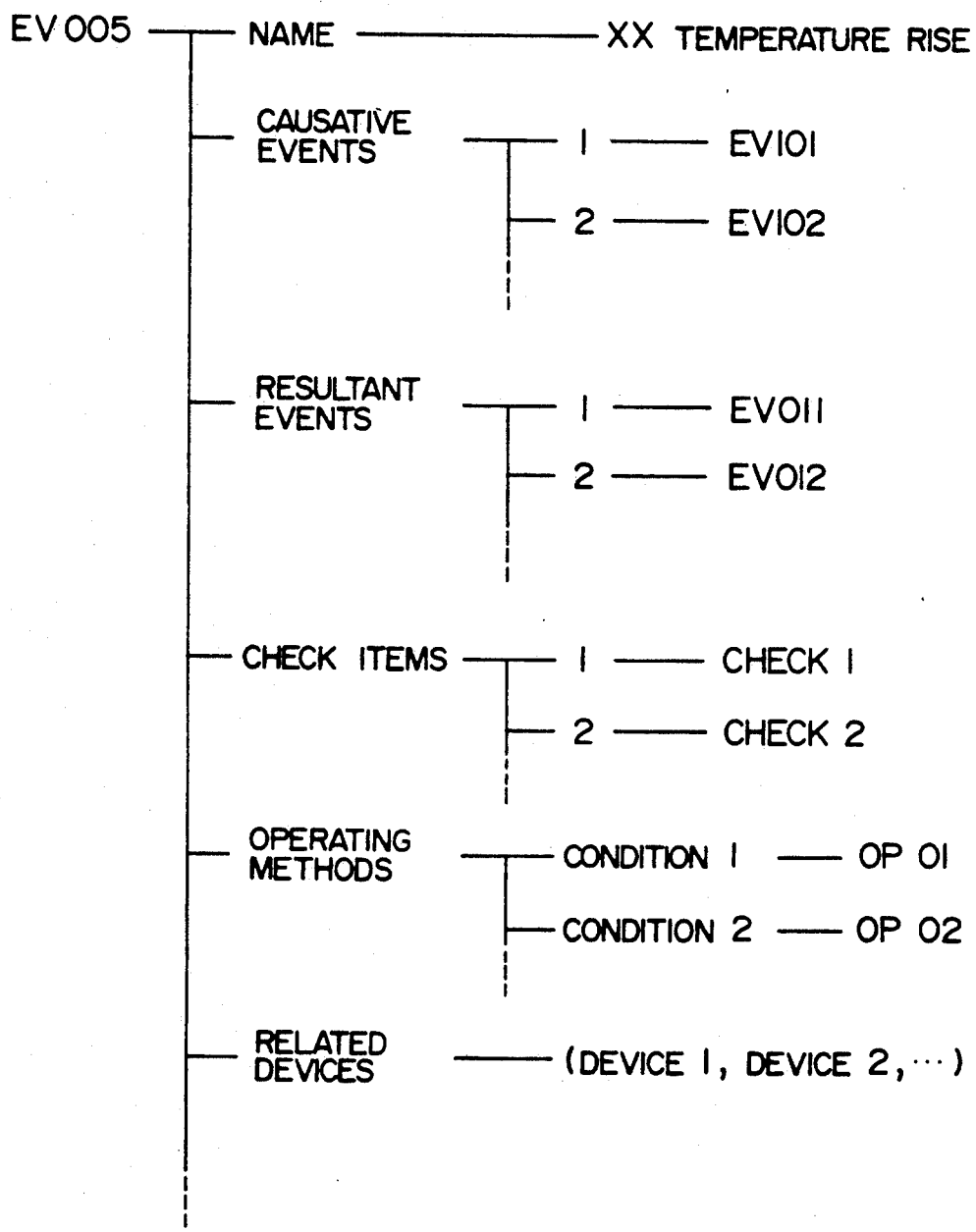

FIGS. 3 and 4 show knowledge to be referred to in the process steps of FIG. 2. Those pieces of knowledge are stored in the storage device 12 in advance. FIG. 3 shows assorted knowledge related to process data. Data on threshold values of absolute ones and threshold values of rates of change is used in steps 100 and 101. For example, data related to threshold values of absolute values is used in making decisions, such as "If 11023 Data-A<130", the plant is in normal state and "If 130≦Data-A<150, the event EV005 occurred." The threshold values of the changing rate are data which is used when a comparison is made between a rate of change of Data A and a changing rate with time of Data-A in order to make a normal/abnormal decision on plant 1. The related data is data related to Data-A. The related data in FIG. 3 is shown to include "Data-J1" and "Data-J2" as data measured on the upstream side of the measuring point of Data-A. The related data is used to check if the measuring instrument for Data-A is out of order from the relation with related data. The related systems indicate the systems related with Data-A. FIG. 4 shows knowledge about the causal relationships between causative events and resultant events, and the operating methods appropriate for these events. A causative event indicates, for example, a cause that brings about an anomalous event EV005 (XX temperature rise). The knowledge shown in FIG. 4 suggests that the events EV101 and EV102 can be the causative events for the anomalous event EV005. A resultant event means an event that may result from the occurrence of the anomalous event EV005. The knowledge shown in FIG. 4 indicates that the resultant events can be the events EV011 and EV012. The check items are data related to the items to be checked when the anomalous event EV005 occurs. The operating methods are intended for restraining the event that has occurred and have been set in consideration of the condition of the plant.

The processes of the steps 100 and 101 in FIG. 2 are performed by using data of the threshold values of absolute ones and the threshold values of the changing rate in FIG. 3. The anomaly cause candidates at the step 102 are searched by retrieving data on causative envents of FIG. 4, stored in the storage device 12. In the process at the step 103, data such as the name, resultant events, check items, operating methods and related devices is used.

Figure 5:
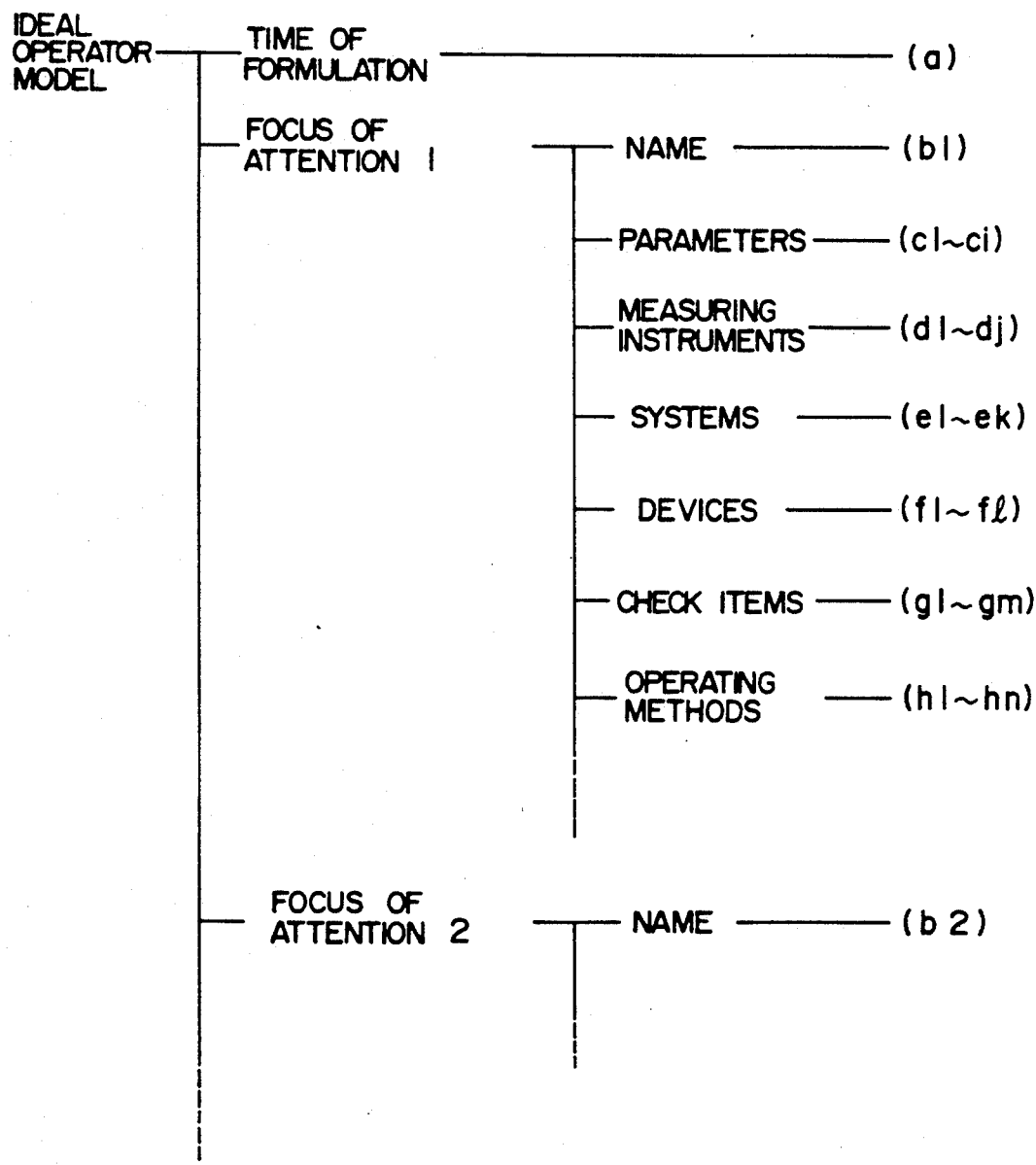
FIG. 5 is a diagram for explaining an ideal operator model made by the plant condition evaluator.

FIG. 5 shows an example of an ideal operator model made at the step 103. The ideal operator model is constructed by arranging the items that the operator should consider and pay attention to. Those items are arranged for each focus of attention. An ideal operator model includes time information concerning the forming of the model, a name, parameters, measuring instruments, systems, devices, check items, and operating methods. A value for a name stands for the name of an anomalous event (valve leakage, for example). The parameters are in the form of values of data representing quantities of state, such as pressure, temperature, and so on. The measuring instruments are represented by names of meters and display units that the operator should look at in connection with an anomalous event in question. The systems and devices indicate the names of those which are related to the anomalous event in question. The operating methods indicate data on operating methods appropriate for anomalous events. Data of the individual items of an ideal operator model, as described, is prepared by use of process data measured at plant 1 and data shown in FIG. 4, etc. The provision of an ideal operator model makes it easy to select out a focus of attention in relation to an anomalous event in question and facilitates identification of the area to which the operator should pay attention. In constructing a user model at the step 403, which will be described later, a focus of attention can be specified in a short time. The ideal operator model can be created or updated each time any anomalous event is detected as shown in the procss of FIG. 2. In the early stage of the occurrence of an anomalous event, there are many items to which the operator must pay attention in order to grasp the plant status. As the anomalous event develops to some extent and the plant status can be grasped more clearly, the number of items requiring attention decreases. The decrease in the number of attention-requiring items means that the focuses of attention have been reduced in extent.

Figure 6A:
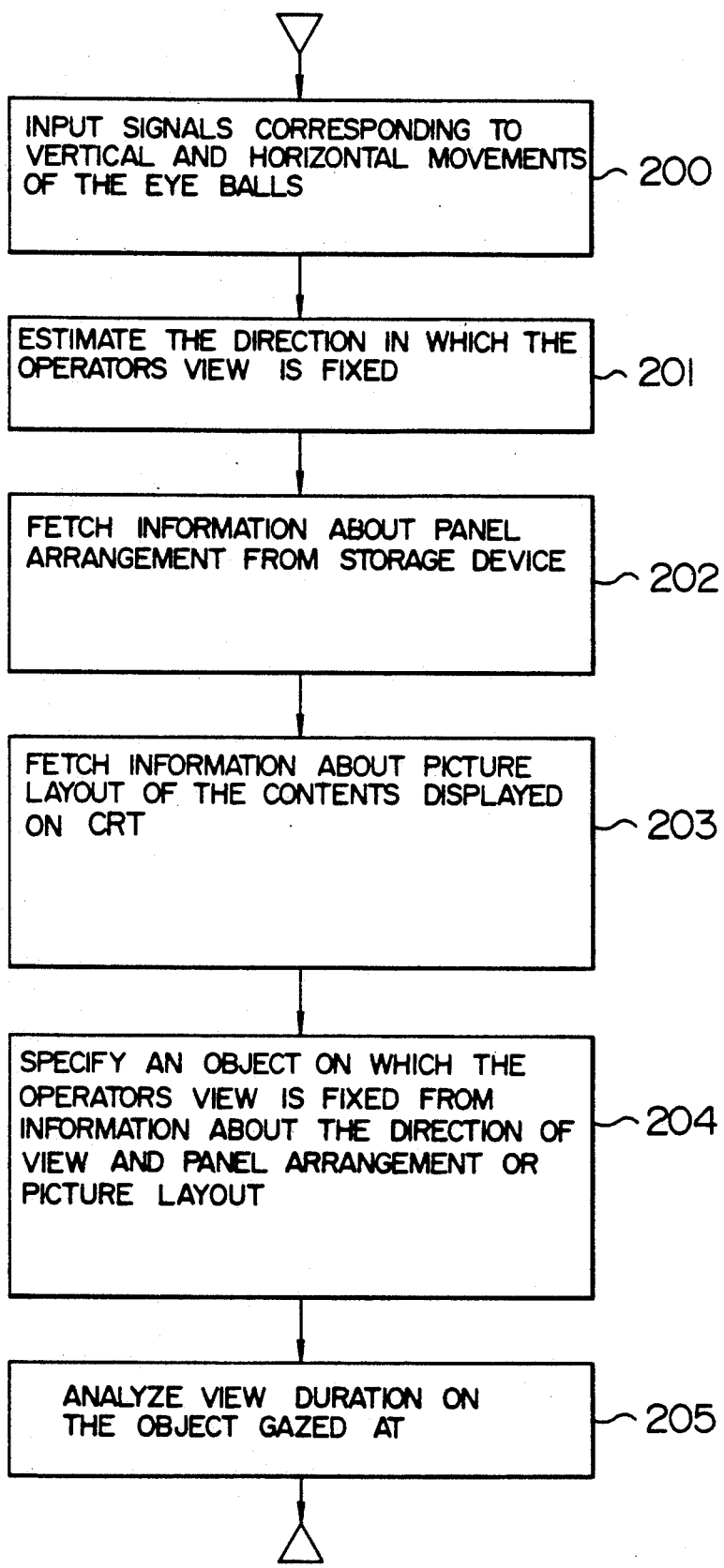
FIG. 6A is a diagram for explaining a procedure to be executed in the viewing information recognizer of FIG. 1.

Referring to FIG. 6A, the process at the viewing information recognizer 7 will be described. At the step 200, a signal is input which indicates the vertical and horizontal movements of the operator's eye balls, the signal being output from the eye-ball movement detector 6. At the step 201, the input signal is analyzed to find the place that the operator is gazing at, and the direction of the operator's gaze is estimated. In addition to this, information about the panel arrangement and, in the case of a CRT, information of the picture layout of the content displayed is retrieved from the storage device (steps 202 and 203). At the step 204, by letting data on the viewing direction overlap the panel arrangement and the picture layout, the object (a display unit 3, data displayed on the display unit 3, meter, etc.) that the operator is gazing at is specified. FIG. 6B shows an example in which the whole of the panel is within the operator's field of view and the direction of his gaze is shown. The solid lines indicate the locus of the viewing point and the thick crosses indicated the stopped positions of the viewing point. FIG. 6B is a case in which the operator is gazing at an operation switch and an alarm indicating the result of the switch manipulation, and the operator's line of sight moves between them.

Then, at the step 205, analysis is made of the viewing duration of the object that the operator is looking at, and information is produced which is related to the objects the operator is gazing at as shown in FIG. 7. For example, data at the uppermost line in FIG. 7 indicates that the operator is gazing at a device displayed on CRT1 for a period from time $t_0$ to $\tau_0$.

Figure 8:
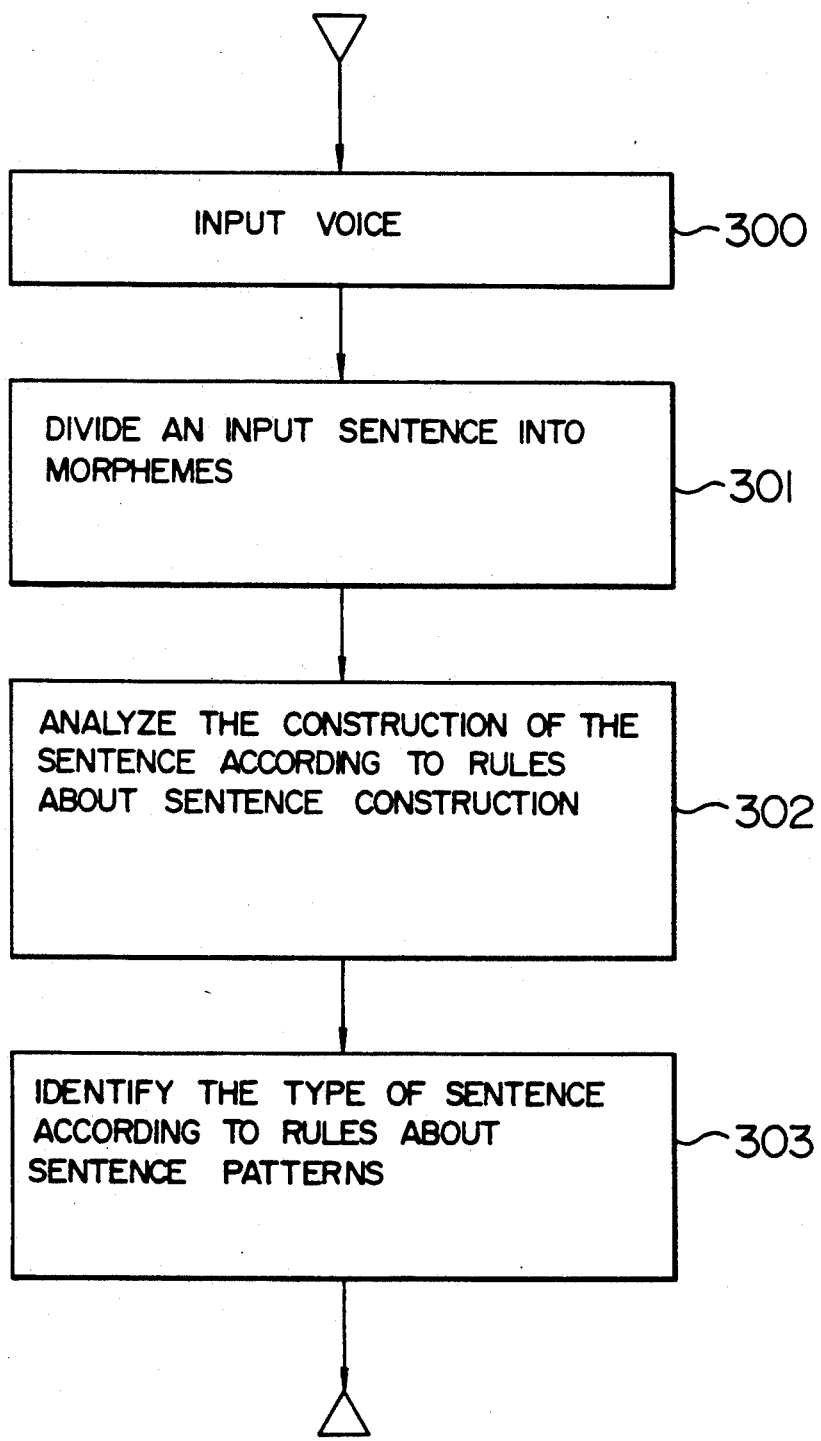
FIG. 8 is an explanatory diagram showing a procedure to be executed by the voice recognizer in FIG. 1.

The voice recognizer 9 executes the process according to the procedure of FIG. 8. Verbal information by the operator is input through the voice input device 8 (step 300). The input sentence is divided into morphemes (separate words) (step 301). The sentence construction of the entered voice information is analyzed according to the rules of construction of sentences like "The sentence is composed of a noun phrase and a sentence", and "The noun phrase is composed of a noun and a particle". And, the grammatical roles of the elements of the sentence are clarified like a subject, a verb, an object, etc. (step 302).

Then, according to the rules for sentence patterns, the type of sentence is identified as a declarative sentence, an imperative sentence, or an interrogative sentence, etc. (step 303).

Figure 9:
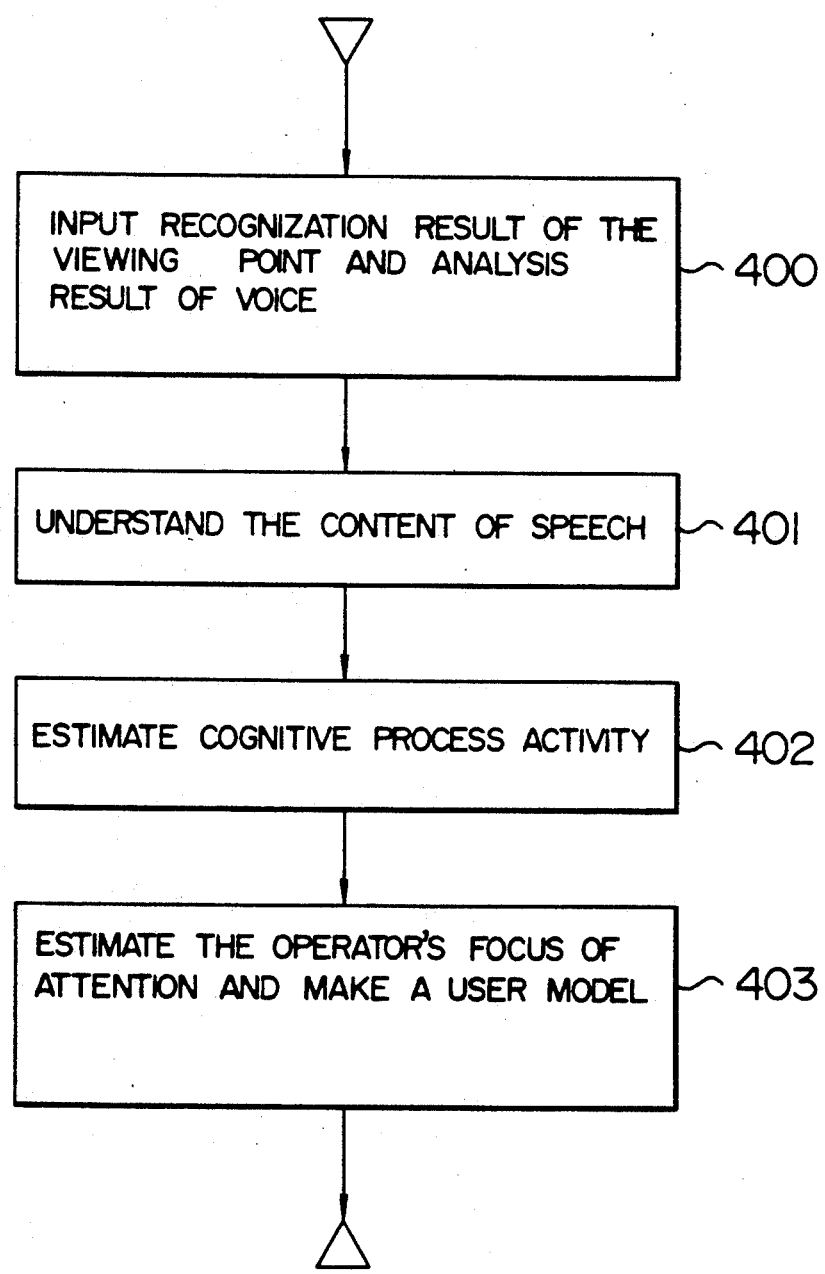
FIG. 9 is an explanatory diagram showing a procedure to be executed by the operator status estimator in FIG. 1.

The process executed in the operator status estimator 10 will be described with reference to FIG. 9. At the step 400, data to be input here includes recognition results of the viewing points obtained at the viewing information recognizer 7, analysis results of voice information obtained at the voice recognizer 8, and data of an ideal operator model made at the plant status evaluator 5. By using those kinds of data entered at the step 400, such a process as supplementing abridged expressions in voice information is performed, and the content of the voice information is understood (step 401). At the step 402, on the basis of the entered voice information and information about the viewing points, a stage of the operator's cognitive process activity at the time when he provided the voice information is estimated. At the step 403, the focus of attention to which the operator is paying attention is estimated, and a user model (operator model) is created.

Figure 10:
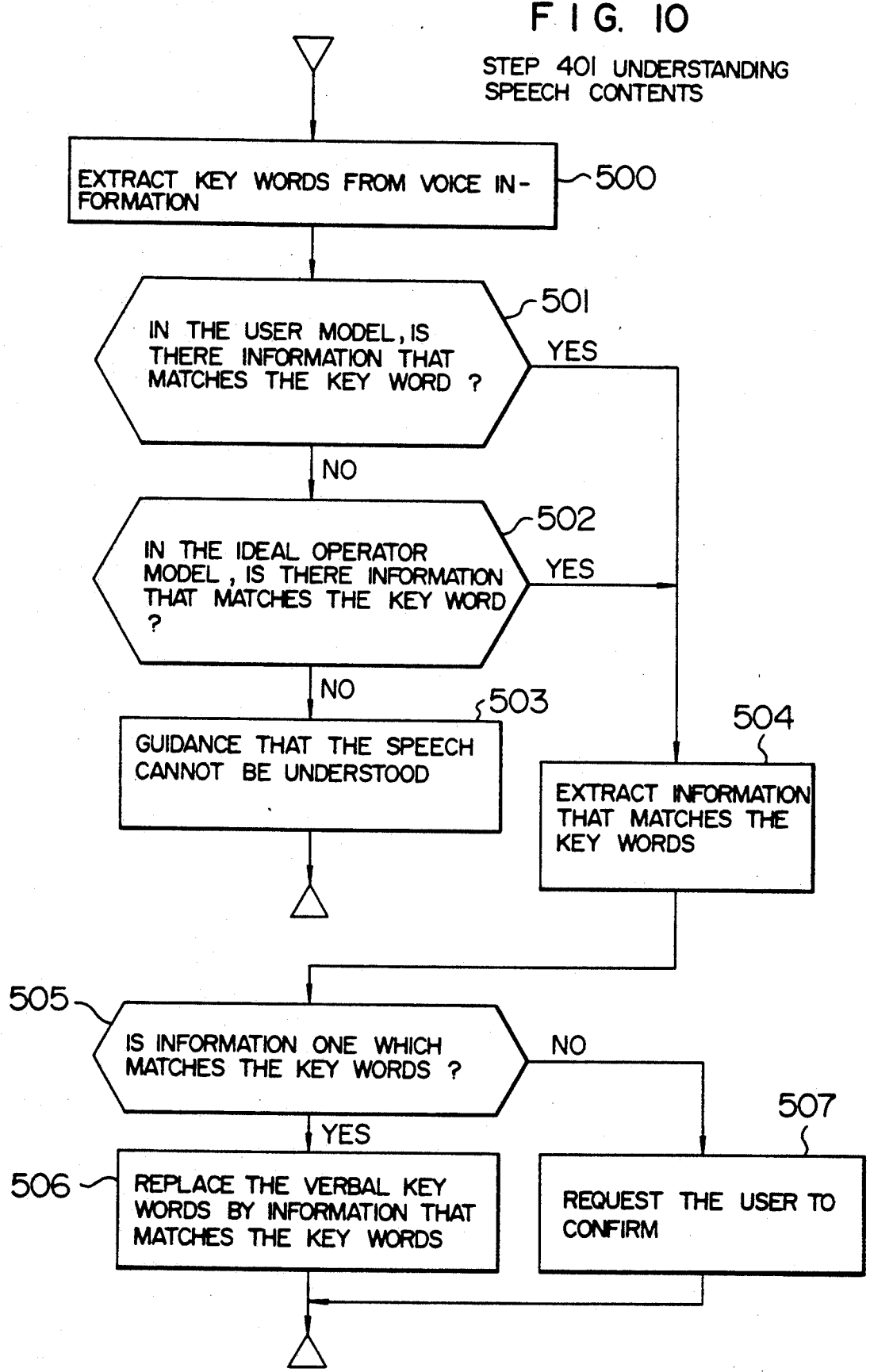
FIGS. 10 and 11 are explanatory diagrams showing detailed procedures of step 401 of FIG. 9.
Figure 11:
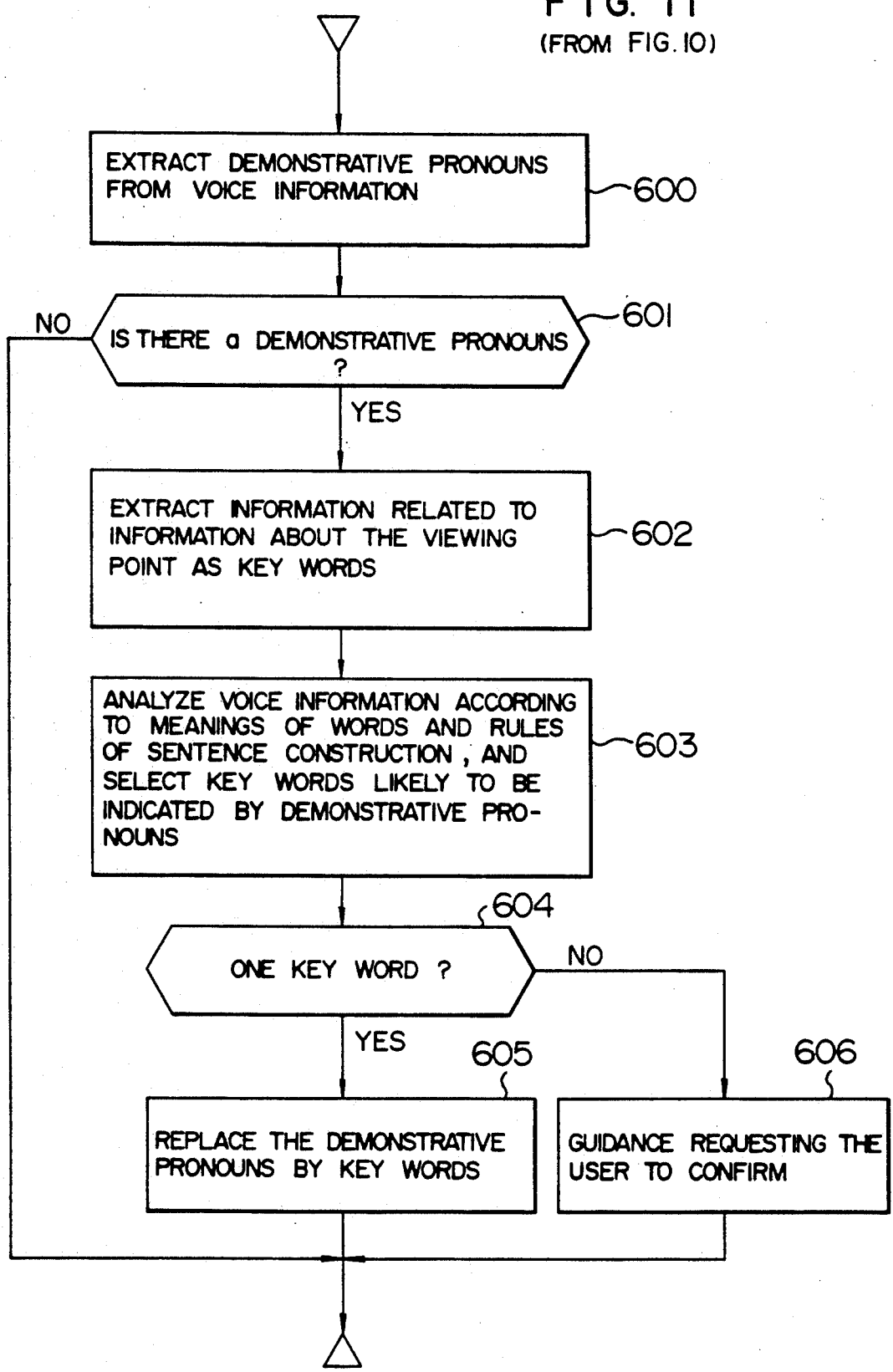

FIGS. 10 and 11 show actual procedures at the step 401. After the process of FIG. 10 has been executed, the process of FIG. 11 is performed. In the process of the step 401, the step 500 is first carried out. From voice information, the key words such as parameters and a system name are extracted (step 500). A check is made if the extracted key words are included in the information in the user model corresponding to an anomalous event in question. This user model has been made and stored in the storage device 12. In carrying out the process of the step 501, the user model corresponding to the anomalous event in question is retrieved and used. If the anomalous event that occurred is of a kind for which no user model has been made, naturally there is no user model available. In this case, the step 500 makes a decision that there is no information that matches any of the key words. In the process of the step 501, if there is no information that perfectly matches the key words, some information that matches the key words to some extent is extracted. For example, for the expression "temperature" in the entered voice information, information related to temperature, such as "the device X outlet temperature" and "the device X inlet temperature" is extracted. In the step 501, if there is information that matches the key words completely or matches the key words to some degree, a decision is made that there is information that matches the key words. When neither of these kinds of information exists, a decision is made that there is no information that matches the key words. When matchable information exists, the process proceeds to the step 504. If no matchable information exists, the process moves on to the step 502. The step 502 determines whether or not information that matches the earliermentioned key words is included the ideal operator model corresponding to the anomalous event in question. Like the step 501, the step 502 does make a presence/absence decision regarding information that matches the key words to some degree. If at the step 502, a decision is made that there is matchable information, the process proceeds to the step 504, and if a decision is made that there is no such information, the process goes to the step 503. At the step 503, guidance information that the key words cannot be understood is output to a display unit 3. This guidance information is displayed on the display unit 3. At the step 504, information that matches the key words is extracted. At the step 505, the number of information extracted is examined, and a decision is made whether or not the extracted information is one. When the extracted information is one, the key words are replaced by that information (step 505). When the extracted information is more than one, information requesting the operator to confirm is output at the display unit 3 (step 507). The steps 501 to 507 are repeated for all the key words extracted at the step 500.

The procedure shown in FIG. 11 will now be described. The process of the step 600 is executed after the step 506 or 507. In the step 600, demonstrative pronouns such as "that" and "this" are extracted from the entered voice information. If, at the step 601, a decision is made that no demonstrative pronoun was extracted, after the step 401 is executed, the process proceeds to the step 402. If, at the step 601, a decision is made that some demonstrative pronoun was extracted, information related to the information about the object, which the operator is gazing at when he generated the voice information, is extracted as a key word from the information described in the user model (or the ideal operator model when the user model does not exists). The extracted key word is analyzed so as to find if it can be replaced by a demonstrative pronoun by considering the meanings of the words and the sentence construction rules (step 603). The step 604 determines whether or not the extracted key word is one. If the extracted word is one, the demonstrative pronoun is replaced by the key word at the step 605. If a plurality of key words exist or no key word exists, guidance information requesting the user to confirm is output on the display unit 3. The steps 602 to 606 are executed repeatedly for all demonstrative pronouns extracted at the step 600. After the step 605 or 606 has been finished, the process moves on to the step 402.

FIG. 12 shows a model proposed by J. Rasmussen regarding an information process (cognitive process) that takes place inside the operator's brain. When the operator finds it necessary to perform an information process, after finishing the processes such as observation and identification of the system status, he carries out an actual operation. In the step 402 described above, in what stage (any of the items A to H of the model of FIG. 12) of the cognitive process activity the operator is being engaged when he generated the voice information is estimated according to the analysis result of the voice information obtained at the voice recognizer 9. FIG. 13 shows examples of knowledge used in estimating the operator's cognitive process activity from the voice information furnished by him. When the operator stated an expression to the effect that he confirmed the issuance of an alarm or it was found that process data deviates from a normal value, it is estimated that the operator's cognitive process activity is anomaly detection. When the operator mentioned an expression about values and changes of process data, the operator's cognitive process activity is estimated to be observation and data gathering. In this manner, estimation is performed based on the expressions characteristic of the cognitive process activities shown in FIG. 13.

FIG. 14 shows the details of the user model creation process at the step 403. The user model is composed of items and focuses of attention to which the operator actually pays attention, and is created by using data of the ideal operator model and data obtained at the viewing information recognizer 7 and the voice recognizer 9.

Figure 15:
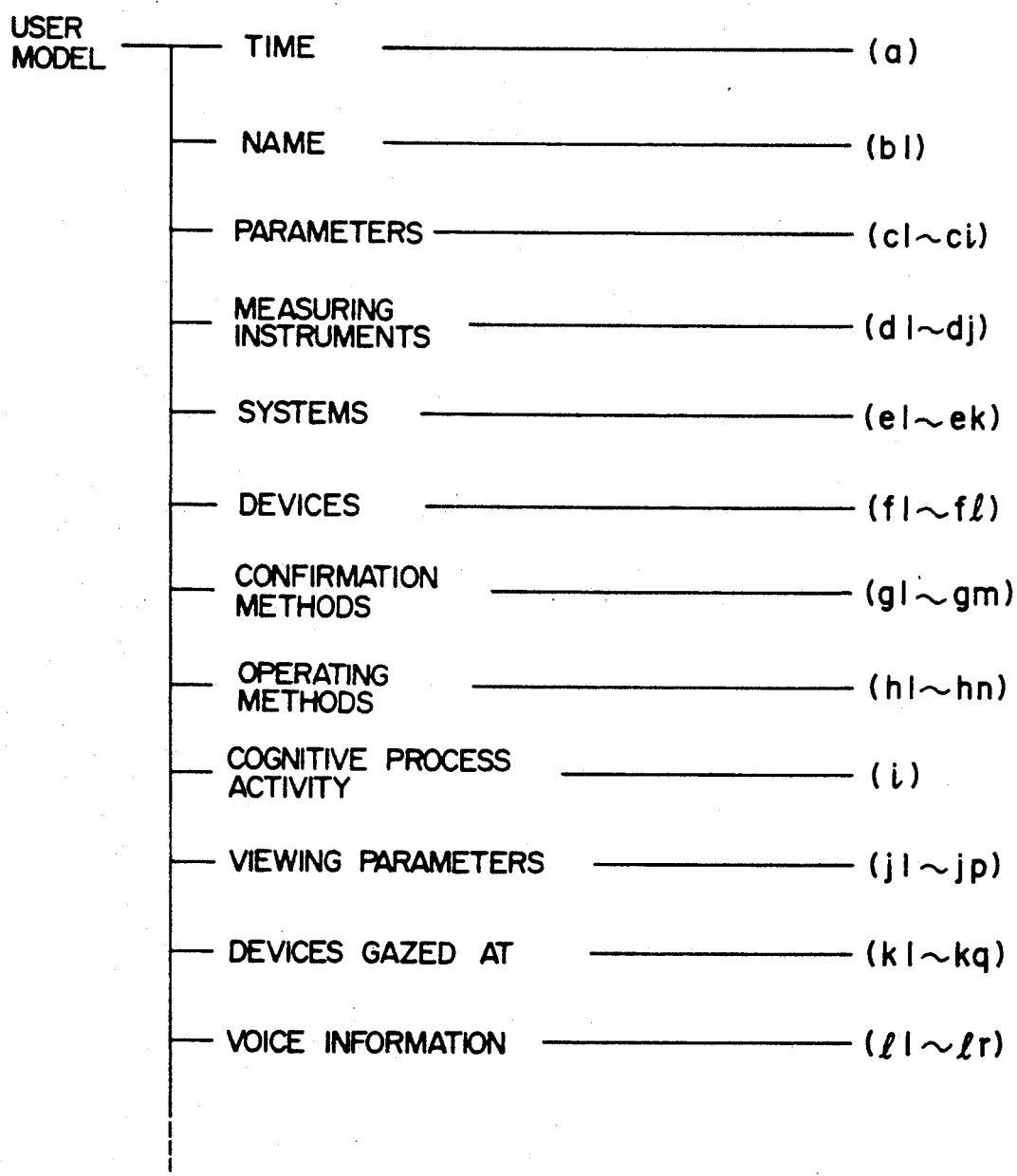
FIG. 15 is an explanatory diagram showing a user model made at step 403 of FIG. 9.

The step 700 determines whether or not voice information has been input. If voice information has been input, key words that indicate a system name, a device name, etc. are extracted from "information and the key words that match" obtained by execution of the procedures of FIGS. 10 and 11 (step 701). Then, focuses of attention having key words that were extracted at the step 701 from among a plurality of focuses of attention included in the ideal operator model (step 702). And, a decision is made whether or not the retrieved focus of attention is one (step 703). If the focus of attention is one, the user model including data related to that focus of attention is used as the archetype of the user model (step 704). Then, the object X estimated at the step 201 is input (step 705). Information on the device or parameter that the operator is looking at is identified according to data on the estimated object X (step 711). At the step 712, a user model is created or updated by incorporating data on the estimated object X and the analysis result of the voice information. At the same time, the history of the creation and updating is recorded. FIG. 15 shows an example of the created user model. The values of the items of the focuses of attention retrieved at the step 702 are used for the values of the items from the name to the operating method, out of all the items of this user model. For the value of the item of the cognitive process activity of the user model, the estimation result of the cognitive process activity obtained at the step 402 is used. The values of the paramter and the device the operator is looking at intently is data on the estimated object X. The values of the item of voice information are the matchable information obtained at the 506 of the step 401 and the key words obtained at the step 605. The information corresponding to the items of the parameters gazed at, the devices gazed at and voice information is the information to which the operator is currently paying attention. The means for processing according to the procedures of FIGS. 10 and 11 are means for estimating the information to which the operator is paying attention. If the decision at the step 703 is "no", that is to say, if there are a plurality of focuses of attention retrieved at the step 702, or if the decision of the step 700 is "no", the movement of the operator's eyes, namely, information on the viewing point is utilized. In the step 706, data on the object estimated at the step 201 is input. In addition, the viewing duration at the object X is measured and accumulated (step 707). A decision is made whether or not analysis of the viewing point information was done for a predetermined time (1 min., for example), namely, whether or not the steps 706 and 707 were repeated for a predetermined time (step 708). By making this decision in which the steps 706 to 708 were executed, it follows that analysis was made how long the operator was looking at the object X within the predetermined time. After the elapse of the predetermined time (when the decision of the step 708 has become "yes"), in the step 709, according to the result of accumulation of viewing duration obtained at the step 707, the viewing duration for each focus of attention of the ideal operator model is estimated. Using a focus of attention for which the total gaze duration is longest, an archetype of the user model is created (step 710). Then, the step 711 is performed and the process moves on to the step 712. At the step 712, a user model is created or updated, and the history of creation and updating is stored in the storage device 12.

The user model is updated when some change occurred in voice information generated by the operator's, the object at which the operator is gazing, or the plant status even though the operator is dealing with the same anomalous event. As shown in FIG. 15 and as described earlier, the user model includes information about one focus of attention selected from the ideal operator model corresponding to an anomalous event in question (namely, information, which the operator should be aware of regarding this anomalous event) and information provided by the operator (information indicating the current status of the operator). In extracting matching information in the process of the step 401, the first action is to extract matching information based on a decision at the step 501, so that voice information generated by the operator can be understood in a short time. This is because in contrast to the ideal operator model having information about a plurality of focuses of attention, the user model has a small amount of information about one focus of attention, which makes it possible to make a presence/absence decision about matching information, and extract matching information in a short time. In addition, if the ideal operator model includes a plurality of focuses of attention, by using voice information generated by the operator and information about the operator's viewing point, one focus of attention that the operator requires can be estimated with high accuracy out of a plurality of focuses of attention in the ideal operator model. This facilitates editing of adequate information which matches an anomalous event and which is necessary for the operator. Since a user model is created after an ideal operator model has been created, it is easy to select out data necessary for editing of information as mentioned above. The user model is a kind of knowledge base which is a collection of information which best matches an anomalous event at the moment and which is currently required by the operator.

The user model has information drawing attention from the operator who is interacting with the man-machine system 14. Therefore, a fact that the system side has a user model means that the operator and the system share the same subject of conversation. Thus, when the operator provides an abstract expression, the system can understand what is meant by that expression. For example, let us suppose a case where a human being asks "What is the water level ?". If the name of the user model is "Monitoring the plant important parameter", this question can be understood as asking "What is the water level of the nuclear reactor ?". If the user model is created for "Monitoring the suppression pool", the question can be understood as asking "What is the water level of the suppression pool". In short, an abstract expression of water level can be replaced by a concrete physical quantity by utilizing the user model. In order to execute this process more accurately, information about the operator person's line of sight is used. If information about the operator's line of sight is used, abstract expressions, such as "that" and "this" can be dealt with.

FIG. 16A indicates the procedure in the information editor 11. Data of the user model prepared by the operator status estimator 10 is inputted (step 800). In the step 801, a decision is made on which unit 3 necessary information is supplied according to the contents of the items of voice information stored in the user model and information of the device the operator is gazing at. At the step 802, a decision is made on the type in which supplied information is provided. Information to be provided is edited (step 803), and announcement information is given to the operator through either of a voice output device 4 or a display unit 3. At the step 805, the edited supplied information is outputted to the unit to receive the information, decided at the step 801.

Figure 17:
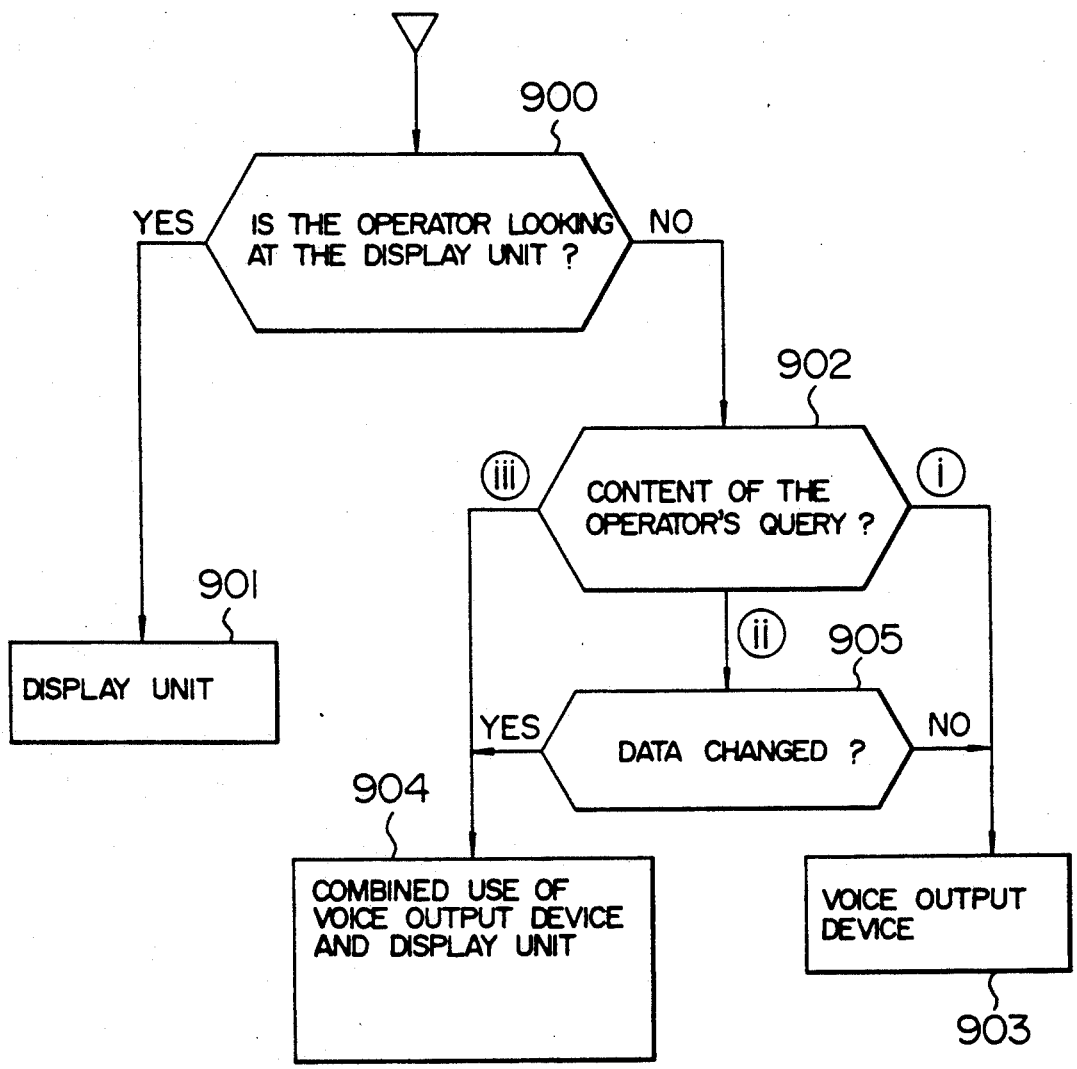
FIG. 17 is an explanatory diagram showing a detailed procedure of step 801 in FIG. 16A.

FIG. 17 shows a detailed procedure of the step 801. First of all, a decision is made whether or not the operator is looking at a display unit 3 (step 900). If the decision is "yes" at the step 900, the display unit which the operator is looking at is decided as the unit which supplies information to the operator (step 901). If the decision is "no" at the step 900, a decision is made, at the step 902, regarding which the operator's query is among (i) a query about the value of process data, (ii) a query about changes in process data, and (iii) a query about operation (voice information). If a decision made at the step 902 is that the operator's query is a query of (i), a voice output device 4 is selected as the unit which supplies information to the operator (step 903). If the decision made at the step 902 is that the operator's query is a query of (ii), a voice output device 4 is selected to be the unit which supplies information to the operator (step 903). If the decision was a query of (iii), display units 3 and voice output devices 4 are selected as the unit which supplies information to the operator (step 904). If the decision made at the step 903 is a query of (iii), a decision is made, at the step 905, whether or not relevant process data has changed. If the decision made at the step 905 is "Process data changes", the process of the step 904 is executed, and if the decision is "Process data does not change", the process of the step 903 is executed. As described, at the step 801 it is possible to select the most adequate unit to supply information to at the moment according to voice information and information about the operator's eyes.

In deciding, at the step 802, a form in which information is displayed, data on the operator's cognitive process activity in the user model and the operator's perceptive characteristics are taken into consideration. For example, under the condition that the operator is performing the cognitive process activities, such as "Observation" and "Identification of the system status" in the model of FIG. 12, information is displayed in graphic representation of the system construction. Under the condition that the operator is performing the cognitive process activities, such as "Selection of procedure" and "Execution of procedure", information is displayed in a flow chart. Particularly in this embodiment, as described above, by estimating the stage of the operator's cognitive process activities by use of voice information and line-of-sight information, it is possible to accurately estimate what the operator is thinking at the very moment. Since the form in which information is supplied is decided according to the estimated stage of the cognitive process, it is possible to supply information suitable for the operator's thinking process at the step 803, which will be described next.

In preparing data for display at the step 803, supplied information is arranged to suit the form of information display described above by using information in the user model, data on the plant status output from the plant status evaluator 5, and process data.

FIG. 16B shows an example of display of edited information. This example shows a case where information is summarized on the SR valve because the objects to which the operator pays attention range widely, including the temperature of the SR valve, and those which are affected by the SR valve, such as the reactor pressure, reactor water level, and the temperature of S/C (suppression chamber). FIG. 16C shows a case where a plurality of viewing points exist or where there is requirement for many types of information with regard to one viewing point.

In this example, an anomaly-related system diagram 803a, a trend diagram 803b of the main parameters, and an event sequence 803c are displayed by means of the multi-window method.

The operator manipulates the switches on the operation panel 2 when necessary in order to output operation commands (or control commands) to the devices of the plant according to information supplied by the display unit 3 and the voice output device 4.

In this embodiment, not only voice information but also information about the operator's line of sight are taken into consideration, so that information can be supplied adequately which is necessary for the operator. Even if voice information is generated by the operator in abstract or abridged expression, information which the operator may require can be estimated accurately and adequate information can be provided. Since a stage of the operator's cognitive process activity is estimated, information appropriate for that stage, which the operator requires, can be provided at proper timing. Furthermore, means for presenting information and the form of presentation are decided according to the content of voice information, information about the operator's line of sight, and evaluation results of the plant status, so that information can be supplied in a form easily understandable to the operator.

This embodiment can be applied not merely to thermal power plants, nuclear power plants, chemical plants and other plants but also to systems including the devices operated according to operation commands from the operation panel (ships, airplanes, for example). This embodiment can also be applied to the operation of a simulator such as a plant operation training system.

Description will now be made of another embodiment of the information editor in the above-mentioned embodiment. The information editor according to this embodiment performs the processes of the steps 801 and 802 by using knowledge engineering. A man-machine system using the information editor according to this embodiment stores knowledge expressed according to production rules shown in FIGS. 18 and 19. Knowledge of FIGS. 18 and 19 is used at the steps 801 and 802, respectively. In deciding the unit to supply information to at the step 801, it is decided in consideration of the type of query, the direction of the operator's line of sight, the plant status, and the cognitive process of a human being. Basically, information is presented to the CRT (display unit 3) on which the operator's line of sight is placed. If the line of sight is off the CRT, voice output is used. Depending on the plant status, both voice output and CRT display may both used as indicated the rule (5) of FIG. 18. In a case where there is no time for looking at the CRT because the operator is engaged in the process steps such as observation, identification and interpretation in the cognitive process model as in the rule (6), voice output is utilized. Though only the CRT is mentioned as the display unit in FIG. 18, a large-picture display unit can be used. Needless to say, it is better to use a large-picture display unit when there is information which is of a kind which many people should look at simultaneously.

Description will next be made of the process of the step 802 which uses knowledge of FIG. 19. As in the rules (1) to (3) of FIG. 19, information can be supplied in a form easily understandable to the operator by changing the form of display according to the cognitive process of the operator. As in the rules (4) and (5) of FIG. 19, the form of display can be changed according to the degree of importance of information to be displayed. The degree of importance is the degree of importance assigned to each focus of attention in the ideal operator model, and is set in consideration of the plant status, and the degree of influence on the plant. Thus, an attention arousing function can be realized to prevent the operator from overlooking important information. As shown in FIGS. 18 and 19, information is presented by deciding means for presenting information and a form of presentation according to the kind of query, the line of sight of a human being, the cognitive proceeds, and the evaluation result of the plant status. Therefore, a user-friendly man-machine system can be realized.

FIG. 20 shows a man-machine system according to another embodiment of this invention. The man-machine system according to this embodiment is the same as the embodiment of FIG. 1, excepting the additional provision of an ITV camera 14 and a picture processing unit 15. The ITV camera 14 monitors the movement of the operator and sends signals to the picture processing unit 15. The picture processing unit 15 processes the entered picture signals and analyzes the operator's standing position, and the direction of his face and the facial expression. These data are transmitted to the operator status estimator 16. The operator status estimator 16 performs the same processes (the processes of FIGS. 9 to 11, and 14) as the operator status estimator 10 in FIG. 1. In addition, the operator status estimator 16 estimates the information to which the operator is paying attention and the operator's state of mind according to his standing position, and the direction of his face and the facial expression, thereby accurately analyzing the status of the operator. The information editor 11 too performs almost the same process as the information editor 11 of FIG. 1. In this embodiment, however, the information editor is capable of the process of FIG. 21. The procedure of FIG. 21 corresponds to the process of the step 801 in FIG. 16. The process of the step 801 in this embodiment is identical with the procedure of FIG. 17, excepting the addition of the steps 906 and 907. At the step 906, a decision is made whether or not the display unit can be seen from the operator's position. If the operator is located at a position where he cannot see the display unit 3, a voice output device 4 is selected as a unit to supply information to (step 907). If the decision of the step 906 is "no", the process steps from the step 900 onward are executed.

Also in this embodiment, an ideal operator model and a user model having the same items as in the embodiment of FIG. 1 are created.

By use of this embodiment, the same effect as in the embodiment described earlier can be obtained. Furthermore, if the operator stands in a position where he cannot see the display unit 3 as at the rear side of the operation panel, necessary information can be supplied by means of a voice output device. Moreover, for a display unit selected at the step 904, it is possible to select a display unit 3 located in a place nearest to the position where the operator is standing or a display unit 3 in the direction in which the operator's face is directed. Particularly in this embodiment, information can be supplied to an information output device conveniently located for the operator to obtain the information.

In the foregoing description, the user model is created by extracting information from the ideal operator model according to the operator's line of sight and voice information. However, it is possible to create a user model by analyzing only the operators's line of sight and voice information. In this case, a check can be made if the operator overlooks important information or if he is paying attention in a wrong direction by comparing the ideal operator model with the user model. Therefore, the attention arousing function can be strengthened.

Figure 23:
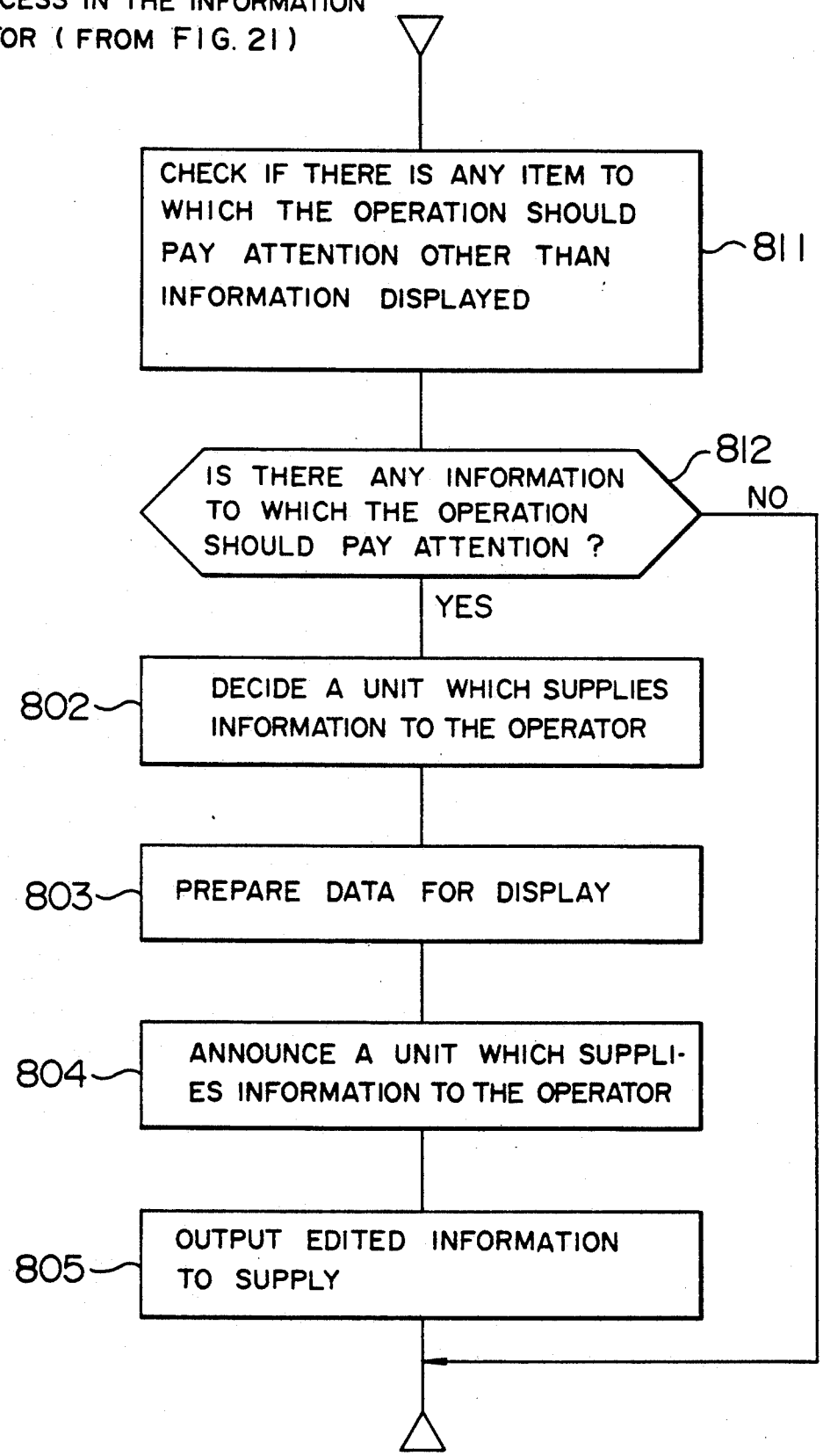

A man-machine system according to yet another embodiment of this invention, which will be described next, is the one with a strengthened attention arousing function. The man-machine system according to this embodiment is almost identical with the embodiment of FIG. 1, only difference being the addition of the functions shown in FIGS. 22 and 23. The procedures of FIGS. 22 and 23 are executed after the step 805 in FIG. 6 is completed. The process of FIG. 22 is first carried out. Information to which the operator should pay attention is extracted from the data prepared for display at the step 803 (step 806). This means that important information prepared at the step 803 is extracted from the information on the parameters and the operating method included in the user model shown in FIG. 15. Information about the operator's line of sight (input through the viewing information recognizer 7) is examined to check whether or not the operator saw the information extracted at the step 806 (step 807). At the step 809, a decision is made whether there is any information overlooked. If overlooked information exists, the process of the step 810 is executed to output a signal to rouse attention. The signal to arouse attention is output on the relevant display unit 3. The signals to arouse attention include a signal to change the displayed color at a part where there is overlooked information, a signal to make that part flicker, and an attention-arousing signal in voice. Then, the procedure of FIG. 23 is executed. This process is for a case where there is information requiring the operator's attention in addition to the information displayed by the process of FIG. 6. At the step 811, a search is made for any other information requiring attention. This means to extract information which is not displayed from information on the parameters and the operating method, included in the user model shown in FIG. 15. If there is information which is not displayed and requires attention (decided at the step 812), the unit which supplies information to the operator is decided, and the information is edited and output.

According to this embodiment, the effect of the embodiment of FIG. 1 can be obtained, and in addition to this, when the operator did not look at the information to which he should pay attention and which is included in the information displayed, his attention can be called to the information. Also, it is possible to check if there is an omission of display of important information, and even if an omission of display occurred, the information can be displayed quickly. Above all, inspection is made for the operator's overlooking of information according to information about the operator's line of sight, so that overlooking can be detected accurately.

In the embodiments described above, a user model is created automatically according to an ideal operator model constructed in the plant status evaluator 5, and information obtained at the gaze information recognizer 7 and the voice recognizer 9.

Figure 24:
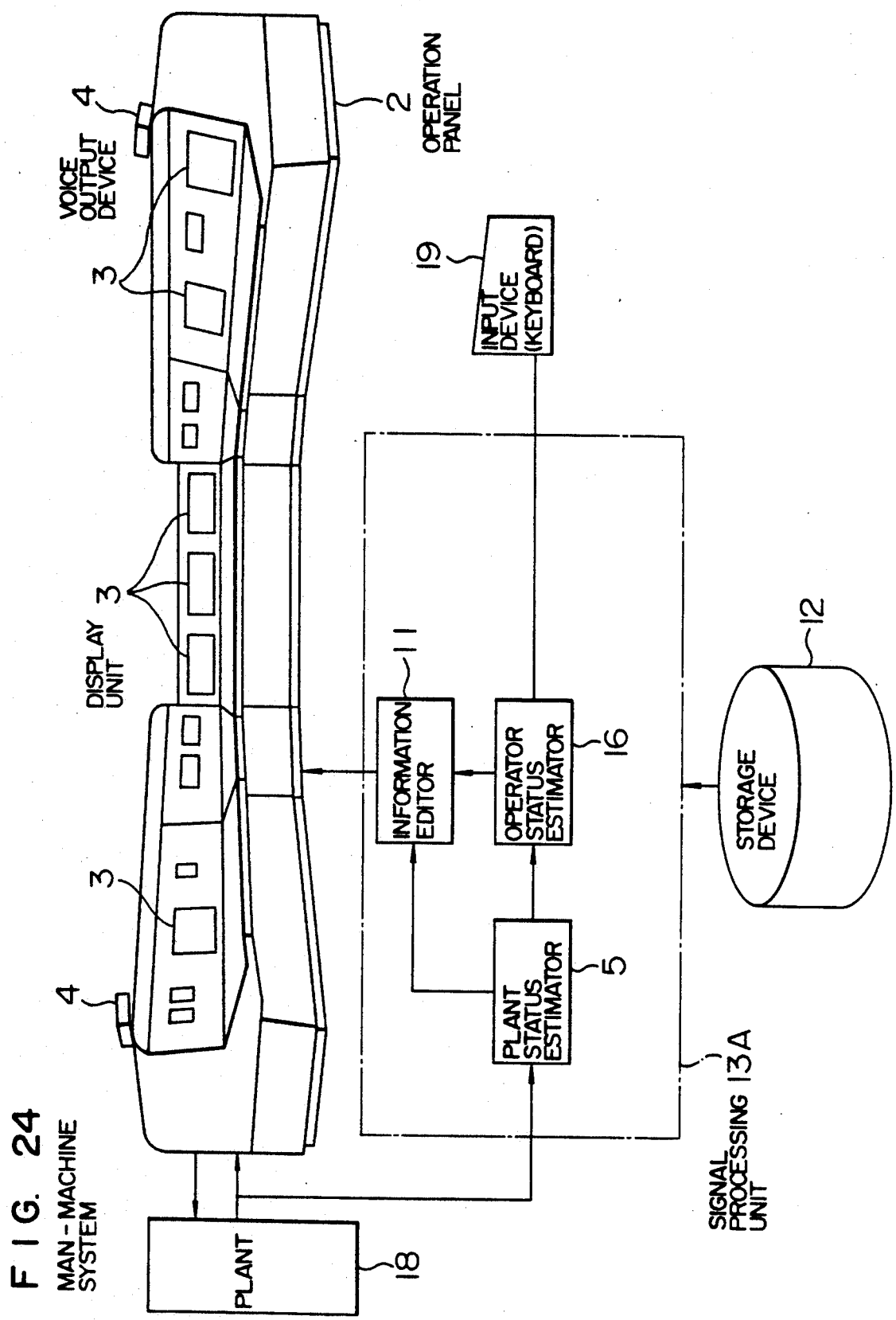

The operator's intention can be reflected in the creation of the user model. This embodiment is shown in FIG. 24. The man-machine system of this invention is provided with a signal processing unit 13A and an input device (keyboard) 19. The signal processing unit 13A includes a plant status evaluator 5, an information editor 11, and an operator status estimator 16. The plant status evaluator 5 outputs an ideal operator model created according to the procedure of FIG. 2 to the information editor 11. The information editor 11 prepares display information (refer to FIG. 25) which shows for each focus of attention the information on the focus of attention included in the entered ideal operator model, and outputs the display information to the relevant display unit 3. This display information is displayed on that display unit 3. The operator specifies, through the input device 19, a necessary focus of attention out of the focuses of attention displayed, and inputs, through the input device 19, data required for creating a user model, such as the parameters and devices that he gazes at, and in what stage of the cognitive process of the model of FIG. 12 the operator is engaged. The operator status estimator 10 receives data input through the input device 19, and creates a user model as shown in FIG. 15, which includes information about the focus of attention selected by the operator. The information editor 11 prepares information to be presented to the operator by using a user model as in the embodiment of FIG. 1.

Since the user model can be created by having the operator's will directly reflected in it, information that the operator requires can be supplied to him securely. The effect obtainable by the embodiment in FIG. 1 can be produced by this embodiment by use of an ideal operator model and a user model.

We claim:

1. A man-machine system comprising:
   an operation model;
   storage means for storing operation data;
   a plurality of regions provided on an operation panel, each one of said plurality of regions being related with said operation data adoptable under a certain operating condition;
   means for creating a first operator model including a plurality of focuses of attention to regions to which an operator should pay attention with regard to said certain operating conditions of equipment to be controlled;
   first information recognizing means for inputting information generated by a voice of said operator;
   means for estimating a stage of operation which said operator is engaged in out of said focuses of attention included in said first operator model by using voice information generated by said operator and inputted to said first information recognizing means;
   second information recognizing means for inputting information generated by an operator's line of sight;
   means for selecting a part of said operation data from said storage means based on said information about said operator's line of sight;
   means for creating a second operator model corresponding to an operator model including said estimated focus of attention; and
   means for editing supplied information by using information about said estimated focus of attention included in said second operator model.

2. A man-machine system according to claim 1, wherein said first operator model includes time information for forming said first operator model.

3. A man-machine system according to claim 1, wherein said second operator model includes information of cognitive process activity estimated based on information from said operator.

4. A man-machine system according to claim 1, further comprising: means for estimating a stage of an operator's cognitive process activity by using said voice information and said information about said operator's line of sight, and means for deciding a form in which information is supplied according to said estimated stage of said cognitive process activity, wherein said information editing means edits said supplied information according to said decided form.

5. A man-machine system according to claim 4, wherein said information editing means includes selectedinformation supply means for supplying information selected according to information about said estimated focus of attention.

6. A man-machine system according to claim 1, further comprising:
   means for checking whether said operator looked at least one information edited by said information editing means according to said information about said operator's line of sight after displaying said edited information, and outputting a signal to arouse said operator's attention if information exists that said operator did not look at.

7. A man-machine system comprising:
   means for creating a first operator model including a plurality of focuses of attention which an operator should pay with regard to a certain operating condition of equipment having control means;
   means for estimating a focus of attention that said operator requires out of said focuses of attention included in said first operator model by using voice information generated by said operator and information about an operator's line sight;
   means for creating a second operator model corresponding to an operator model including said estimated focus of attention;
   means for selecting an unit which supplies information to said operator, said unit having been decided in advance according to said voice information and said information about said operator's line of sight; and
   means for editing supplied information by using information about said estimated focus of attention included in said second operator model and information obtained from said equipment having said control means, and outputting said supplied information, to said decided unit which supplies information to said operator.

8. A man-machine system comprising:
means for creating a first operator model including a plurality of focuses of attention that an operator should pay with regard to a certain operating condition of equipment having control means;
means for estimating a focus of attention that said operator requires out of said focuses of attention included in said first operator model by using voice information generated and entered by said operator and information about an operator's line sight;
means for estimating information to which said operator is paying attention according to said voice information and said information about said operator's line of sight;
means for creating a second operator model corresponding to an operator model including information about said estimated focus of attention and information to which said operator is paying attention; and
means for editing supplied information by using said kinds of information includes in said second operator model and information obtained from the equipment having said control means.

9. A man-machine system according to claim 8, further comprising: means for comparing information obtained by said information editing means with said information included in said second operator model in order to check whether there is any piece of the latter information which is not included in the former information, wherein if there is any piece of said latter information that is not included in said former information, said information is additionally edited by said information editing means.

10. A man-machine system comprising:
means for creating a first operator model including a plurality of focuses of attention which an operator should pay with regard to a certain operating condition of equipment having control means;
means for estimating a focus of attention that said operator requires out of said focuses of attention included in said first operator model by using voice information generated and entered by said operator and information about an operator's line sight;
means for creating a second operator model corresponding to an operator model including said estimated focus of attention;
means for editing supplied information by using information about said estimated focus of attention included in said second operator model and information obtained from said equipment having said control means,
display means for displaying said information edited by said information editing means;
voice output means;
a television camera; and
means for deciding according to video signals displayed on said television camera whether said operator is located in a position where said operator can look at said display means, and outputting said edited information to said voice output means if said operator is located in a position where said operator cannot look at said display means.

11. A man-machine system comprising:
means for creating a first operator model including a plurality of focuses of attention that an operator should pay with regard to a certain operating condition of equipment having control means;
means for estimating a focus of attention that said operator requires out of said focuses of attention included in said first operator model by using voice information generated and entered into a display information creating device by said operator and information about an operator's line sight;
means for creating a second operator model including information about said estimated focus of attention; and
means for editing information to display by using information about said estimated focus of attention and information obtained form said equipment having said control means.

12. An operating apparatus comprising:
an operation panel having information output means;
means for creating a first operator model including a plurality of focuses of attention that an operator should pay with regard to a certain operating condition of equipment having said control means;
means for estimating a focus of attention that said operator requires out of said focuses of attention included in said first operator model by using voice information generated by said operator and information about an operator's line of sight;
means for creating a second operator model including information about said estimated focus of attention; and
means for editing supplied information to said information output means by using said information about said estimated focus of attention included in said second operator model and information obtained from said equipment to be controlled.

13. A man-machine system according to claim 1, wherein said voice information includes a pronoun and said selecting means selects a part of said operation data based on a portion of one of said plurality of regions at said operator's line of sight.

* * * * *